(12) United States Patent
Wang et al.

(10) Patent No.: US 10,549,996 B2
(45) Date of Patent: Feb. 4, 2020

(54) POLYMER COATED MULTIWALL CARBON NANOTUBES

(71) Applicants: SABIC Global Technologies B.V., Bergen op Zoom (NL); Georgia Tech Research Corporation, Atlanta, GA (US)

(72) Inventors: Po-Hsiang Wang, Atlanta, GA (US); Sushanta Ghoshal, Summerville, SC (US); Nikhil Verghese, Lake Jackson, TX (US); Satish Kumar, Atlanta, GA (US)

(73) Assignees: GEORGIA TECH RESEARCH CORPORATION, Atlanta, GA (US); SABIC GLOBAL TECHNOLOGIES B.V., Bergen op Zoom (NL)

( * ) Notice: Subject to any disclaimer, the term of this patent is extended or adjusted under 35 U.S.C. 154(b) by 0 days.

(21) Appl. No.: 16/066,467

(22) PCT Filed: Nov. 29, 2016

(86) PCT No.: PCT/US2016/064008
§ 371 (c)(1),
(2) Date: Jun. 27, 2018

(87) PCT Pub. No.: WO2017/116592
PCT Pub. Date: Jul. 6, 2017

(65) Prior Publication Data
US 2019/0002286 A1 Jan. 3, 2019

Related U.S. Application Data

(60) Provisional application No. 62/272,468, filed on Dec. 29, 2015, provisional application No. 62/323,146, (Continued)

(51) Int. Cl.
C01B 32/168 (2017.01)
C08J 3/20 (2006.01)
(Continued)

(52) U.S. Cl.
CPC .......... C01B 32/168 (2017.08); C01B 32/174 (2017.08); C08J 3/203 (2013.01);
(Continued)

(58) Field of Classification Search
CPC ..... C01B 32/168; C01B 32/174; C08K 3/041; C09D 7/20; C09D 123/12; C08J 3/203; C08J 3/226; C08L 23/12
(Continued)

(56) References Cited

U.S. PATENT DOCUMENTS 6,187,823 B1 2/2001 Haddon et al.
6,426,134 B1 7/2002 Lavin et al.
(Continued)

FOREIGN PATENT DOCUMENTS

CN 1654528 8/2005
EP 1054036 11/2000
(Continued)

OTHER PUBLICATIONS

Qingliang He et al: "Flame retardant polypropylene/multiwall carbon nanotube nanocomposites . . . " Macromolecular Chemistry and Physics, vol. 215, No. 4, Feb. 13, 2014, pp. 327-340.*
(Continued)

Primary Examiner — Alexandre F Ferre
(74) Attorney, Agent, or Firm — Norton Rose Fulbright US LLP

(57) ABSTRACT

Polypropylene-coated functionalized multiwall carbon nanotubes (PP/f-MWNT) comprising functionalized multiwall carbon nanotubes (f-MWNT) in an amount of from about 0.5 wt. % to about 80 wt. %, based on the total weight
(Continued)

of the PP/f-MWNT; and polypropylene (PP) in an amount of from about 20 wt. % to about 99.5 wt. %, based on the total weight of the PP/f-MWNT. A method of making PP/f-MWNT comprising (a) contacting pristine multiwall carbon nanotubes (p-MWNT) with nitric acid to produce f-MWNT; (b) contacting at least a portion of the f-MWNT with a first solvent to form a f-MWNT dispersion; (c) contacting PP with a second solvent to form a PP solution; (d) contacting at least a portion of the f-MWNT dispersion with at least a portion of the PP solution to form a PP and f-MWNT suspension; and (e) drying at least a portion of the PP and f-MWNT suspension to form the PP/f-MWNT.

20 Claims, 18 Drawing Sheets

Related U.S. Application Data filed on Apr. 15, 2016, provisional application No. 62/323,151, filed on Apr. 15, 2016.

(51) Int. Cl.

| | | |
|---|---|---|
| C08J 3/22 | (2006.01) | |
| C09D 123/12 | (2006.01) | |
| C08K 3/04 | (2006.01) | |
| C01B 32/174 | (2017.01) | |
| C09D 7/20 | (2018.01) | |
| C08L 23/12 | (2006.01) | |
| B82Y 30/00 | (2011.01) | |
| B82Y 40/00 | (2011.01) | |

(52) U.S. Cl.
CPC .............. *C08J 3/226* (2013.01); *C08K 3/041* (2017.05); *C08L 23/12* (2013.01); *C09D 7/20* (2018.01); *C09D 123/12* (2013.01); *B82Y 30/00* (2013.01); *B82Y 40/00* (2013.01); *C01B 2202/06* (2013.01); *C01B 2202/36* (2013.01); *C01P 2002/72* (2013.01); *C01P 2002/82* (2013.01); *C01P 2002/86* (2013.01); *C01P 2002/88* (2013.01); *C01P 2004/02* (2013.01); *C01P 2004/03* (2013.01); *C01P 2004/04* (2013.01); *C08J 2323/12* (2013.01); *C08L 2207/10* (2013.01); *C08L 2310/00* (2013.01)

(58) Field of Classification Search
USPC ........................................................ 428/407
See application file for complete search history.

(56) References Cited

U.S. PATENT DOCUMENTS

| | | | |
|---|---|---|---|
| 6,936,653 B2 | 8/2005 | McElrath et al. | |
| 7,244,407 B2 | 7/2007 | Chen et al. | |
| 7,247,670 B2 | 7/2007 | Malenfant et al. | |
| 7,264,876 B2 | 9/2007 | Smalley et al. | |
| 7,459,137 B2 | 12/2008 | Tour et al. | |
| 7,547,472 B2 | 6/2009 | Chen et al. | |
| 7,754,328 B2 | 7/2010 | Chokai et al. | |
| 7,780,875 B2 | 8/2010 | Asgari | |
| 7,838,587 B2 | 11/2010 | El Bounia et al. | |
| 8,211,958 B2 | 7/2012 | Chu et al. | |
| 8,841,454 B2 | 9/2014 | Habeeb | |
| 8,961,834 B2 | 2/2015 | Bastiaens et al. | |
| 8,980,136 B2 | 3/2015 | Niu et al. | |
| 9,012,534 B2 | 4/2015 | Debras et al. | |
| 2003/0089893 A1 | 5/2003 | Niu et al. | |
| 2006/0122284 A1 | 6/2006 | Rodriguez-Macias et al. | |
| 2007/0255002 A1 | 11/2007 | Alba | |
| 2010/0283174 A1 | 11/2010 | Ma et al. | |
| 2011/0220851 A1* | 9/2011 | Sue .......................... | C08K 7/00 252/507 |

FOREIGN PATENT DOCUMENTS

| | | |
|---|---|---|
| EP | 1359121 | 5/2003 |
| EP | 1589079 | 10/2005 |
| EP | 1995274 | 11/2008 |
| EP | 2436720 | 4/2012 |
| JP | 2011006511 | 1/2011 |
| KR | 201065051 | 1/2012 |
| KR | 2015041400 | 4/2015 |
| WO | WO 2004/001107 | 12/2003 |
| WO | WO 2006/106214 | 10/2006 |
| WO | WO 2008/030038 | 3/2008 |
| WO | WO 2008/058589 | 5/2008 |
| WO | WO 2008114910 | 9/2008 |
| WO | WO 2009/063008 | 5/2009 |
| WO | WO 2011/060839 | 5/2011 |
| WO | WO 2012/127357 | 9/2012 |
| WO | WO 2013/107875 | 7/2013 |
| WO | WO 2014048755 | 4/2014 |

OTHER PUBLICATIONS

Yang B X et al: "Enhancement of the mechanical propoperties of polypropylene using . . . carbon nanotubes", Composite Science and Technology, Elsevier, Amsterdam, NL, vol. 68, No. 12, Sep. 1, 2008, pp. 2490-2497.*
Causin, et al., "Nucleation, Structure and Lamellar Morphology of Isotactic Polypropylene Filled with Polypropylene-Grafted Multiwalled Carbon Nanotubes," European Polymer Journal, 45(8), 2155-2163, 2009.
He, et al., "Flame-Retardant Polypropylene/Multiwall Carbon Nanotube Nanocomposites: Effects of Surface Functionalization and Surfactant Molecular Weight," Macromolecular Chemistry and Physics, 215(4), 327-340, 2014.
International Search Report and Written Opinion Issued in Corresponding PCT Application No. PCT/US2016/064008, dated Feb. 23, 2017.
Yang, et al., "Enhancement of the Mechanical Properties of Polypropylene Using Polypropylene-Grafted Multiwalled Carbon Nanotubes," Composites Science and Technology, Elsevier, 68(12), 2490-2497, 2008.

* cited by examiner

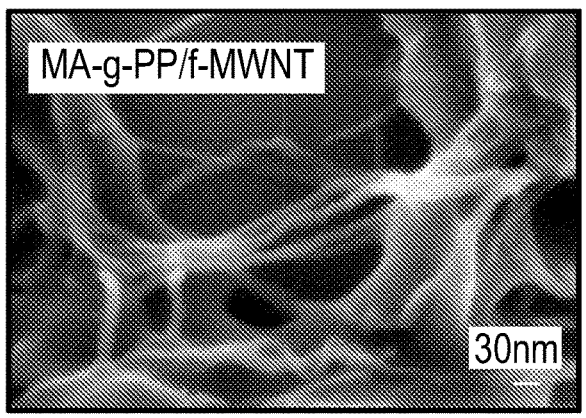 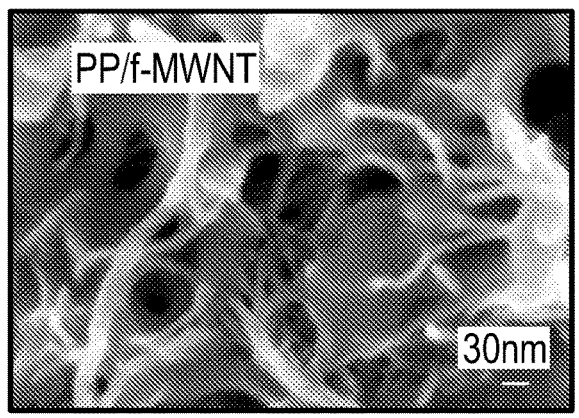
FIG. 5A FIG. 5B
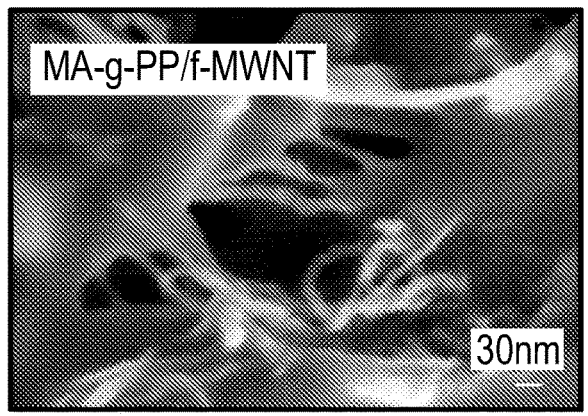 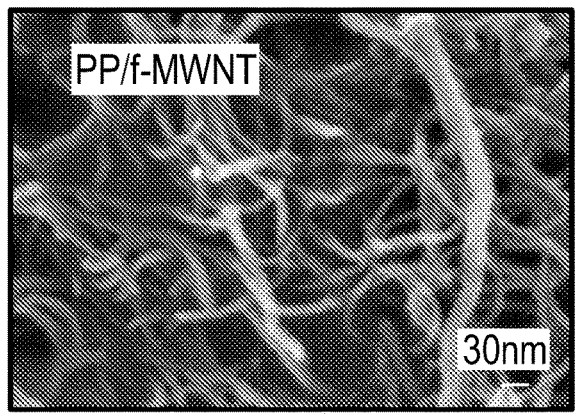
FIG. 5C FIG. 5D
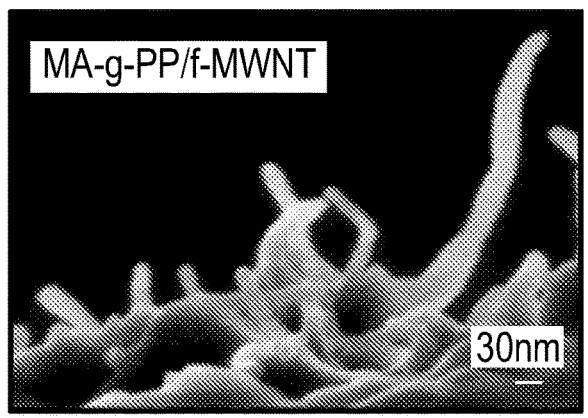 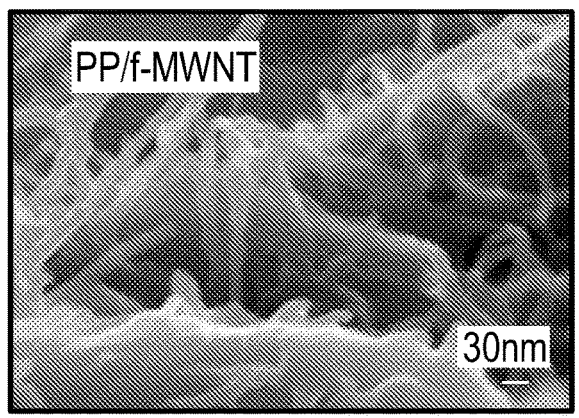
FIG. 5E FIG. 5F

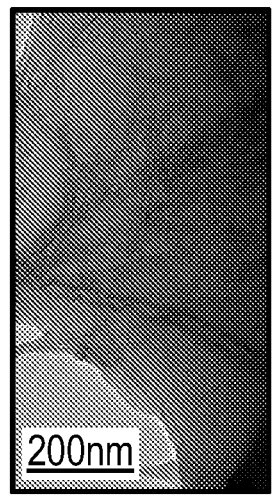 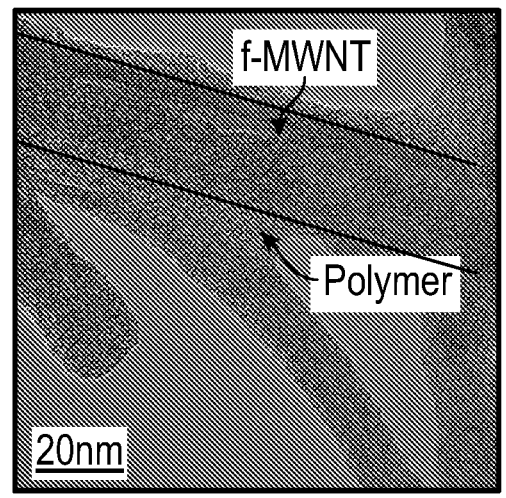
FIG. 6A        FIG. 6B
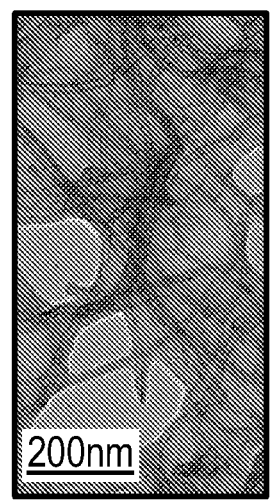 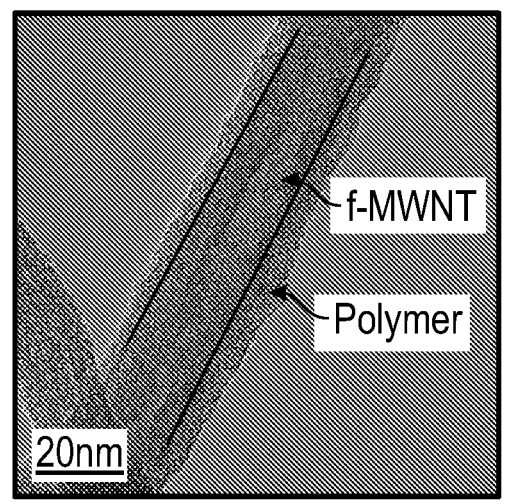
FIG. 6C        FIG. 6D

POLYMER COATED MULTIWALL CARBON NANOTUBES

CROSS-REFERENCE TO RELATED APPLICATIONS

This application is a national phase application under 35 U.S.C. § 371 of International Application No. PCT/US2016/064008 filed Nov. 29, 2016, which claims the benefit of priority of U.S. Provisional Patent Application No. 62/272,468 filed Dec. 29, 2015, U.S. Provisional Patent Application No. 62/323,146 filed Apr. 15, 2016 and U.S. Provisional Patent Application No. 62/323,151 filed Apr. 15, 2016. The entire contents of each of the above-referenced disclosures are specifically incorporated herein by reference.

TECHNICAL FIELD

The present disclosure relates to polymer coated carbon nanotubes and methods of making same, more specifically polypropylene coated multiwall carbon nanotubes and methods of making same.

BACKGROUND

Carbon nanotubes (CNT), including multiwall carbon nanotubes (MWNT), have been incorporated into various polymer systems owing to their outstanding tensile modulus (270-950 GPa), tensile strength (11-63 GPa), as well as thermal (200-3000 W/m/K at 300 K) and electrical conductivity (102-107 S/m at 300 K). While interfacial stress transfer from nanotubes to polymer accounts for mechanical reinforcement, CNT can also act as a nucleating agent for polymer crystallization, as well as induce the formation of a highly ordered interphase polymer layer in many polymer/CNT composites.

Polypropylene (PP) is a widely used commercial polymer due to its excellent chemical stability, physical and mechanical properties, processability and low cost. PP has numerous industrial applications, such as fiber manufacturing, packaging, automotive components, construction, etc. Over the years, PP has been reinforced with fibrous fillers (e.g., carbon, Kevlar, natural fibers) and particulate fillers (e.g., talc, mica, clay), as well as by melt blending with other polymers to enhance its mechanical properties. Emergence of CNT has paved the way for new polymer composite applications in various fields, such as electromagnetic interference (EMI) shielding, enhanced oxygen barrier performance, and for antistatic purposes.

Although the benefits of introducing CNT into PP can be many fold, it is difficult to fully disperse CNT into the PP polymer matrix, since CNT tend to bundle together through van der Waals forces. Only a limited number of organic solvents, such as N,N-dimethylformamide (DMF), 1,2-dichlorobenzene (ODCB), N-methylpyrrolidinone (NMP), tetrahydrofuran (THF) and chloroform, are known to disperse CNT to some extent. Nanocomposites incorporating CNT can be successfully produced via a solution approach with conjugated polymers, aromatic polymers, and other polar polymers like pol(vinyl chloride), polyacrylonitrile, poly(methyl methacrylate), poly(vinyl alcohol) and poly(ethylene oxide), etc. However, PP, due to its non-polar nature, does not have sufficient solubility in these solvents.

Several approaches have been used for improving the dispersion of CNT in PP, for example chemical modification of CNT and/or the polymer through covalent functionalization and grafting; incorporation of a compatibilizer such as maleic anhydride grafted PP (MA-g-PP) and maleic anhydride grafted styrene-ethylene/butylenes-styrene copolymer (MA-SEBS); surfactants, such as sodium dodecyl sulfate (SDS) and sodium dodecylbenzene sulfonate (NaDDBS); master batch dilution; mechanical dispersion including ultra-sound assisted melt extrusion; and some combinations thereof.

PP coating of CNT has been reported via grafting of MA-g-PP or PP. One method stabilizes CNT in aqueous solution via non-covalent association between nanotubes and poly(vinyl pyrrolidone) (PVP), wherein the PVP wrapped CNT can be further dispersed in other polymers, e.g., in poly(vinyl alcohol). Another method produced PE wrapped CNT via crystallization in ODCB, wherein the MWNT were wrapped by a homogenous coating of PE, while a PP coating could not be achieved by the same procedure. In yet another method, CNT were encapsulated with MA-g-PP via a solution mixing approach by using butanol and xylene. Ball milling was also used for forming CNT polymer composites, and while some MA-g-PP chains adsorbed onto sidewalls of MWNT, PP did not exhibit the same behavior. Thus, there is an ongoing need for the development of PP coated CNT (PP/CNT) and methods of making same, wherein the PP encapsulates the CNT via a non-perturbing PP coating (e.g., a PP coating via non-covalent means) to prevent nanotube re-aggregation.

BRIEF SUMMARY

Disclosed herein is a method of making polypropylene-coated functionalized multiwall carbon nanotubes (PP/f-MWNT), the method comprising (a) contacting pristine multiwall carbon nanotubes (p-MWNT) with nitric acid to produce functionalized multiwall carbon nanotubes (f-MWNT), (b) contacting at least a portion of the f-MWNT with a first solvent to form a f-MWNT dispersion, (c) contacting polypropylene (PP) with a second solvent to form a PP solution, (d) contacting at least a portion of the f-MWNT dispersion with at least a portion of the PP solution to form a PP and f-MWNT suspension, and (e) drying at least a portion of the PP and f-MWNT suspension to form the PP/f-MWNT.

Further disclosed herein are polypropylene-coated functionalized multiwall carbon nanotubes (PP/f-MWNT) produced by a process comprising (a) contacting pristine multiwall carbon nanotubes (p-MWNT) with nitric acid to produce functionalized multiwall carbon nanotubes (f-MWNT), (b) contacting at least a portion of the f-MWNT with a first solvent to form a f-MWNT dispersion. (c) contacting polypropylene (PP) with a second solvent to form a PP solution, (d) contacting at least a portion of the f-MWNT dispersion with at least a portion of the PP solution to form a PP and f-MWNT suspension, and (e) drying at least a portion of the PP and f-MWNT suspension to form the PP/f-MWNT.

Also disclosed herein are polypropylene-coated functionalized multiwall carbon nanotubes (PP/f-MWNT) comprising functionalized multiwall carbon nanotubes (f-MWNT) in an amount of from about 0.5 wt. % to about 80 wt. %, based on the total weight of the PP/f-MWNT; and polypropylene (PP) in an amount of from about 20 wt. % to about 99.5 wt. %, based on the total weight of the PP/f-MWNT.

Also disclosed herein are polypropylene-coated functionalized multiwall carbon nanotubes (PP/f-MWNT) comprising functionalized multiwall carbon nanotubes (f-MWNT) and polypropylene (PP), wherein the PP coats the f-MWNT via non-covalent interactions.

Also disclosed herein are polypropylene-coated functionalized multiwall carbon nanotubes (PP/f-MWNT) comprising functionalized multiwall carbon nanotubes (f-MWNT) in an amount of from about 0.5 wt. % to about 10 wt. %, based on the total weight of the PP/f-MWNT, and polypropylene (PP) in an amount of from about 90 wt. % to about 99.5 wt. %, based on the total weight of the PP/f-MWNT; wherein the PP coats the f-MWNT via non-covalent interactions; wherein the PP is characterized by an isotacticity of from about 90% to 100%; wherein the f-MWNT have a diameter of from about 5 nm to about 20 nm, a length of from about 0.5 microns to about 20 microns, and from about 5 walls to about 15 walls; and wherein a PP coating has thickness of from about 1 nm to about 10 nm.

BRIEF DESCRIPTION OF THE DRAWINGS

For a detailed description of the preferred embodiments of the disclosed methods, reference will now be made to the accompanying drawings in which:

FIGS. 5A through 5F display scanning electron microscopy (SEM) images of PP/f-MWNT and maleic anhydride grafted PP (MA-g-PP) coated f-MWNT (MA-g-PP/f-MWNT);

FIGS. 6A through 6D display TEM images of (a,b) PP/f-MWNT and (c,d) MA-g-PP/f-MWNT master batches;

DETAILED DESCRIPTION

Figures 1A, 1B:
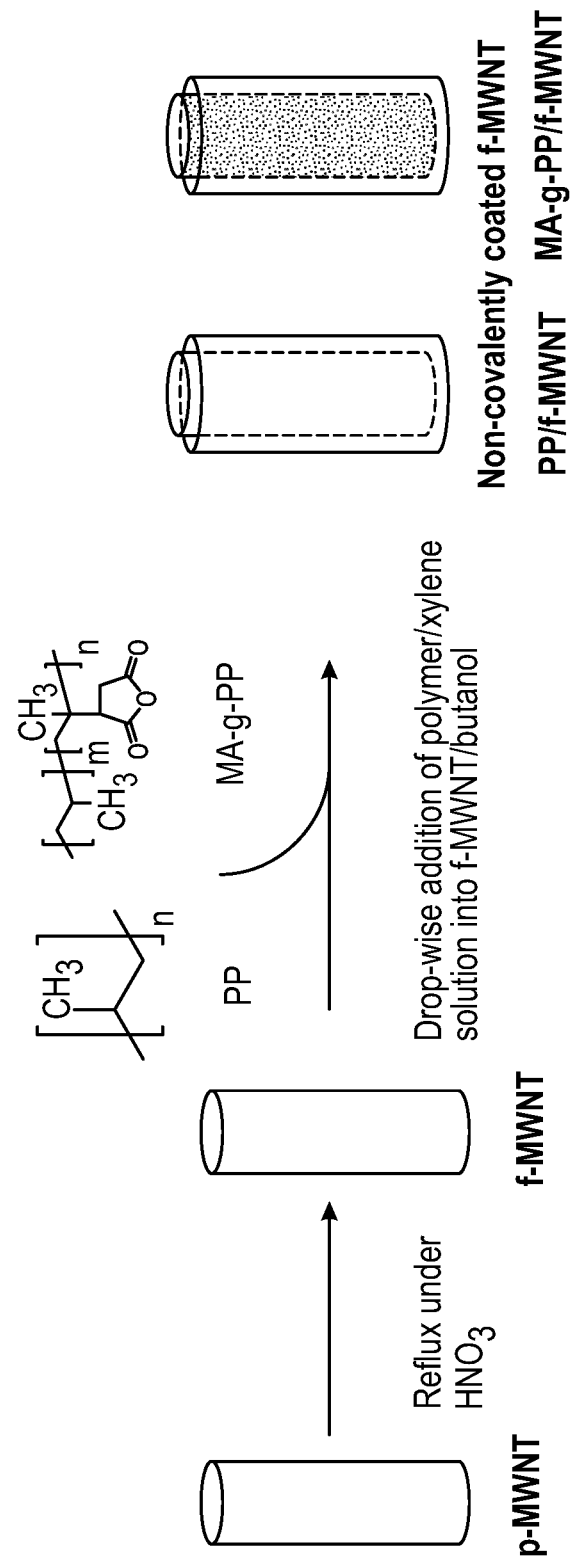
FIGS. 1A and 1B display a schematic illustration of multiwall carbon nanotubes (MWNT) functionalization to produce functionalized multiwall carbon nanotubes (f-MWNT), and polypropylene-coated functionalized multiwall carbon nanotubes (PP/f-MWNT) preparation.

Disclosed herein are polypropylene-coated functionalized multiwall carbon nanotubes (PP/f-MWNT) and methods of making same. In an embodiment, the PP/f-MWNT can comprise functionalized multiwall carbon nanotubes (f-MWNT) in an amount of from about 0.5 wt. % to about 80 wt. %, based on the total weight of the PP/f-MWNT; and polypropylene (PP) in an amount of from about 20 wt. % to about 99.5 wt. %, based on the total weight of the PP/f-MWNT. In such embodiment, the PP can coat the f-MWNT via non-covalent interactions. In an embodiment, the non-covalent interactions can comprise intermolecular CH-π interactions. In an embodiment, the non-covalent interactions exclude hydrogen bonding.

In an embodiment, a method of making PP/f-MWNT can comprise the steps of (a) contacting pristine multiwall carbon nanotubes (p-MWNT) with nitric acid to produce f-MWNT; (b) contacting at least a portion of the f-MWNT with a first solvent to form a f-MWNT dispersion; (c) contacting PP with a second solvent to form a PP solution; (d) contacting at least a portion of the f-MWNT dispersion with at least a portion of the PP solution to form a PP and f-MWNT suspension; and (e) drying at least a portion of the PP and f-MWNT suspension to form the PP/f-MWNT. In such embodiment, the step (e) of drying the PP and f-MWNT suspension can occur under agitating, stirring, magnetic stirring, or combinations thereof; at a temperature of from about from about 40° C. to about 80° C.; and at a pressure of from about 50 mbar to about 1,013 mbar.

Other than in the operating examples or where otherwise indicated, all numbers or expressions referring to quantities of ingredients, reaction conditions, and the like, used in the specification and claims are to be understood as modified in all instances by the term "about." Various numerical ranges are disclosed herein. Because these ranges are continuous, they include every value between the minimum and maximum values. The endpoints of all ranges reciting the same characteristic or component are independently combinable and inclusive of the recited endpoint. Unless expressly indicated otherwise, the various numerical ranges specified in this application are approximations. The endpoints of all ranges directed to the same component or property are inclusive of the endpoint and independently combinable. The term "from more than 0 to an amount" means that the named component is present in some amount more than 0, and up to and including the higher named amount.

The terms "a," "an," and "the" do not denote a limitation of quantity, but rather denote the presence of at least one of the referenced item. As used herein the singular forms "a," "an," and "the" include plural referents.

As used herein, "combinations thereof" is inclusive of one or more of the recited elements, optionally together with a like element not recited, e.g., inclusive of a combination of one or more of the named components, optionally with one or more other components not specifically named that have essentially the same function. As used herein, the term "combination" is inclusive of blends, mixtures, alloys, reaction products, and the like.

Reference throughout the specification to "an embodiment," "another embodiment," "other embodiments," "some embodiments," and so forth, means that a particular element (e.g., feature, structure, property, and/or characteristic) described in connection with the embodiment is included in at least an embodiment described herein, and may or may not be present in other embodiments. In addition, it is to be understood that the described element(s) can be combined in any suitable manner in the various embodiments.

As used herein, the terms "inhibiting" or "reducing" or "preventing" or "avoiding" or any variation of these terms, include any measurable decrease or complete inhibition to achieve a desired result.

As used herein, the term "effective," means adequate to accomplish a desired, expected, or intended result.

As used herein, the terms "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains") are inclusive or open-ended and do not exclude additional, unrecited elements or method steps.

Unless defined otherwise, technical and scientific terms used herein have the same meaning as is commonly understood by one of skill in the art.

Compounds are described herein using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through the carbon of the carbonyl group.

In an embodiment, a polypropylene-coated functionalized multiwall carbon nanotubes (PP/f-MWNT) can be made by using any suitable methodology. In an embodiment, a method of making PP/f-MWNT can comprise a step of contacting pristine multiwall carbon nanotubes (p-MWNT) with nitric acid to produce functionalized multiwall carbon nanotubes (f-MWNT). For purposes of the disclosure herein, the term "pristine multiwall carbon nanotubes" or "p-MWNT" refers to multiwall carbon nanotubes (MWNT) as synthesized, which MWNT could have been subjected to a purification and/or isolation step, but which have not been subjected to a chemical functionalization step. As used herein, "chemical functionalization" refers to a method or process of introducing a functional group in a given structure, for example introducing one or more carboxyl groups into a MWNT structure.

In an embodiment, the step of contacting p-MWNT with nitric acid can comprise contacting at least a portion of the p-MWNT with water to form a p-MWNT aqueous suspension. The p-MWNT aqueous suspension can be homogenized by agitating, stirring, magnetic stirring, sonicating, and the like, or combinations thereof, for a time period of from about 1 minute to about 4 hours, alternatively from about 5 minutes to about 2 hours, or alternatively from about 15 minutes to about 30 minutes. In an embodiment, p-MWNT aqueous suspension can be magnetically stirred. As will be appreciated by one of skill in the art, and with the help of this disclosure, MWNT (e.g., p-MWNT) have a tendency to clump together and settle in solution, and as such a solution or suspension containing MWNT has to be agitated by any suitable methodology to be homogenized.

In an embodiment, at least a portion of p-MWNT aqueous suspension can be contacted with nitric acid to form a p-MWNT acidic suspension, wherein the p-MWNT acidic suspension can have a nitric acid concentration of from about 8 molar (mol/L or M) to about 12 M, alternatively from about 9 M to about 11 M, or alternatively from about 9.5 M to about 10.5 M.

In an embodiment, at least a portion of the p-MWNT acidic suspension can be dispersed to form a p-MWNT acidic dispersion. In an embodiment, dispersing at least a portion of the p-MWNT acidic suspension to form a p-MWNT acidic dispersion can comprise agitating, stirring, magnetic stirring, sonicating, and the like, or combinations thereof, for a time period of from about 5 minutes to about 4 hours, alternatively from about 10 minutes to about 2 hours, or alternatively from about 15 minutes to about 45 minutes. In an embodiment, the p-MWNT acidic suspension can be sonicated to form the p-MWNT acidic dispersion.

In an embodiment, at least a portion of the p-MWNT acidic dispersion can be refluxed to produce the functionalized multiwall carbon nanotubes (f-MWNT). Generally, refluxing can provide for maintaining a substantially constant temperature (e.g., reaction temperature, such as a temperature needed for chemical functionalization of MWNT). The p-MWNT acidic dispersion can be refluxed at a temperature of from about 100° C. to about 140° C., alternatively from about 110° C. to about 130° C., or alternatively from about 115° C. to about 125° C. The p-MWNT acidic dispersion can be refluxed for a time period of from about 12 hours to about 48 hours, alternatively from about 16 hours to about 42 hours, or alternatively from about 18 hours to about 36 hours.

In an embodiment, a method of making PP/f-MWNT can comprise a step of contacting at least a portion of the f-MWNT with a first solvent to form an f-MWNT dispersion. In an embodiment, at least a portion of the f-MWNT can be washed with water to produce water washed f-MWNT.

In some embodiments, washing at least a portion of the f-MWNT with water to produce water washed f-MWNT can comprise repeatedly centrifuging f-MWNT suspended in water and re-suspending the f-MWNT, as many times as necessary to remove substantially all acid from the f-MWNT. For example, a refluxing mixture comprising the f-MWNT can be centrifuged to produce isolated f-MWNT (e.g., as a precipitate) by decanting or otherwise removing the supernatant formed during centrifuging a refluxing mixture comprising the f-MWNT. The isolated f-MWNT can be re-suspended or re-dispersed in water, for example by shaking the f-MWNT in water, vortexing, stirring, and the like, or combinations thereof, and the resulting mixture can be centrifuged to isolate the f-MWNT. As will be appreciated by one of skill in the art and with the help of this disclosure, repeatedly centrifuging and re-suspending the f-MWNT removes acid traces from the f-MWNT, as such acid could interfere with the intended use for f-MWNT. In an embodiment, the f-MWNT can be suspended in water and centrifuged as many times as it is necessary or effective for the supernatant to have a neutral pH. For purposes of the disclosure herein a neutral pH refers to a value of about 7, and/or the pH of the water used for re-suspending the f-MWNT.

In other embodiments, washing at least a portion of the f-MWNT with water to produce water washed f-MWNT can comprise washing the f-MWNT on a filter. For example, a refluxing mixture comprising the f-MWNT can be filtered to produce isolated f-MWNT (e.g., as a precipitate on the filter) by removing a filtrate. The isolated f-MWNT can be washed on the filter with water, until the filtrate reaches a neutral pH. As will be appreciated by one of skill in the art and with the help of this disclosure, repeatedly washing the f-MWNT on the filter can remove acid traces from the f-MWNT, as such acid could interfere with the intended use for f-MWNT.

In yet other embodiments, washing at least a portion of the f-MWNT with water to produce water washed f-MWNT can comprise any suitable combination of (i) repeatedly centrifuging f-MWNT suspended in water and re-suspending the f-MWNT in water and (ii) washing the f-MWNT on a filter, as necessary to remove substantially all acid from the f-MWNT.

In an embodiment, at least a portion of the water washed f-MWNT can be washed with the first solvent to produce first solvent washed f-MWNT. In an embodiment, the first solvent can comprise any suitable polar solvent. Nonlimiting examples of polar solvents suitable for use as a first solvent in the present disclosure include an alcohol, methanol, ethanol, propanol, isopropanol, butanol, pentanol, a mild acid, acetic acid, lactic acid, oxalic acid, formic acid, succinic acid, acetone, and the like, or combinations thereof. As will be appreciated by one of skill in the art, and with the help of this disclosure, functionalizing the MWNT introduces carboxylic groups in the structure of the MWNT, thereby enhancing their solubility (e.g., ability to form a stable suspension or dispersion) in polar solvents. In an embodiment, the first solvent comprises butanol.

In an embodiment, washing at least a portion of the water washed f-MWNT with the first solvent to produce first solvent washed f-MWNT can comprise any suitable combination of (i) repeatedly centrifuging f-MWNT suspended in the first solvent and re-suspending the f-MWNT in the first solvent and (ii) washing the f-MWNT on a filter with the first solvent, as necessary to remove substantially all water from the f-MWNT. As will be appreciated by one of skill in the art, and with the help of this disclosure, the f-MWNT are more soluble in the first solvent than in water, and as such it is important to remove the water from the f-MWNT, to improve the solubility of the f-MWNT in the first solvent.

In an embodiment, washing at least a portion of the water washed f-MWNT with the first solvent to produce first solvent washed f-MWNT can comprise washing the f-MWNT on a filter with the first solvent.

In an embodiment, at least a portion of the first solvent washed f-MWNT can be contacted with the first solvent to form an f-MWNT suspension. The first solvent washed f-MWNT can be suspended in the first solvent by shaking the f-MWNT in the first solvent, vortexing, stirring, and the like, or combinations thereof.

In an embodiment, at least a portion of the f-MWNT suspension can be dispersed to form the f-MWNT dispersion. In an embodiment, dispersing at least a portion of the f-MWNT suspension to form the f-MWNT dispersion can comprise agitating, stirring, magnetic stirring, sonicating, and the like, or combinations thereof, for a time period of from about 24 hours to about 72 hours, alternatively from about 36 hours to about 60 hours, or alternatively from about 42 hours to about 56 hours. In an embodiment, the f-MWNT suspension can be sonicated to form the f-MWNT dispersion.

In an embodiment, the f-MWNT dispersion can have a concentration of f-MWNT in the first solvent of from about 5 mg/liter to about 100 mg/liter, alternatively from about 20 mg/liter to about 80 mg/liter, or alternatively from about 40 mg/liter to about 60 mg/liter, based on the volume of the first solvent. In an embodiment, the f-MWNT dispersion can be stable for a time period of from about 1 month to about 1 year, alternatively from about 2 months to about 10 months, or alternatively from about 3 months to about 9 months.

In an embodiment, a method of making PP/f-MWNT can comprise a step of contacting polypropylene (PP) with a second solvent to form a PP solution. In an embodiment, contacting PP with a second solvent can comprise heating the PP in the second solvent under agitating, stirring, magnetic stirring, and the like, or combinations thereof. The second solvent can be heated to a temperature effective to allow for substantially complete dissolution of PP in the second solvent. As will be appreciated by one of skill in the art, and with the help of this disclosure, PP does not dissolve in solvents under regular conditions, e.g., ambient temperature. Further, as will be appreciated by one of skill in the art, and with the help of this disclosure, the solvent can be heated up to a temperature that is just below the boiling point of the solvent. Further, as will be appreciated by one of skill in the art, and with the help of this disclosure, the solvent can be heated up to a temperature that is just below the melting point of the polymer, when the melting point of the polymer is lower than the boiling point of the solvent.

In some embodiments, the second solvent can be heated to a temperature in a range of from about 80° C. to about 130° C., alternatively from about 90° C. to about 125° C., or alternatively from about 100° C. to about 120° C.

In an embodiment, the second solvent can comprise an aromatic hydrocarbon solvent, a cycloalkane, and the like, or combinations thereof. Nonlimiting examples of second solvent suitable for use in the present disclosure include xylene, o-xylene, m-xylene, p-xylene, ethylbenzene, toluene, tetralin, chlorobenzene, cyclohexane, decalin, and the like, or combinations thereof.

In an embodiment, the PP solution can have a concentration of PP in the second solvent of from about 0.5 g/liter to about 5 g/liter, alternatively from about 1 g/liter to about 4 g/liter, or alternatively from about 1.5 g/liter to about 2.5 g/liter, based on the volume of the second solvent.

In an embodiment, a method of making PP/f-MWNT can comprise a step of contacting at least a portion of the f-MWNT dispersion with at least a portion of the PP solution to form a PP and f-MWNT suspension.

In an embodiment, the f-MWNT dispersion can be heated to a first temperature prior to contacting at least a portion of the f-MWNT dispersion with at least a portion of the PP solution. As will be appreciated by one of skill in the art, and with the help of this disclosure, if the temperature of the f-MWNT dispersion is too low (as compared to the temperature of the PP solution), the PP could precipitate upon contact with the f-MWNT dispersion (as opposed to uniformly dispersing into the forming solvent mixture, to facilitate coating the f-MWNT).

In an embodiment, the PP solution can be characterized by a second temperature in a range of from about 80° C. to about 130° C., alternatively from about 90° C. to about 125° C., or alternatively from about 100° C. to about 120° C. In some embodiments, the second temperature can be the same as the temperature at which the second solvent was heated to in order to facilitate the dissolution of PP in the second solvent. In some embodiments, the second temperature can be different than the temperature at which the second solvent was heated to in order to facilitate the dissolution of PP in the second solvent. For example, the PP solution can be cooled or allowed to cool to the second temperature, wherein the second temperature is lower than the heating temperature of the second solvent by equal to or greater than about 1° C., alternatively equal to or greater than about 5° C., or alternatively equal to or greater than about 10° C.

In an embodiment, the second temperature can be greater than the first temperature. In an embodiment, the second temperature can be greater than the first temperature by equal to or greater than about 30° C., alternatively equal to or greater than about 40° C., or alternatively equal to or greater than about 50° C.

In an embodiment, the PP solution can be added to the f-MWNT dispersion to form the PP and f-MWNT suspension, wherein the f-MWNT dispersion can be characterized by a first temperature, wherein the PP solution can be characterized by a second temperature, and wherein the first temperature can be lower than the second temperature. In an embodiment, the PP solution can be added dropwise to the f-MWNT dispersion to form the PP and f-MWNT suspension. For purposes of the disclosure herein, the term "dropwise" refers to adding the PP solution to the f-MWNT dispersion discontinuously, intermittently, slowly, via discrete or separate aliquots, to prevent the precipitation of the PP upon contact with the f-MWNT dispersion (as opposed to uniformly dispersing into the forming mixture, to facilitate coating the f-MWNT).

In an embodiment, the PP solution can be added to the f-MWNT dispersion at a flow rate of from about 20 mL/minute to about 40 mL/minute, alternatively from about 22.5 mL/minute to about 37.5 mL/minute, or alternatively from about 25 mL/minute to about 35 mL/minute.

In an embodiment, the PP solution can be added to the f-MWNT dispersion under agitating, stirring, magnetic stirring, and the like, or combinations thereof, to form the PP and f-MWNT suspension.

In an embodiment, the PP and f-MWNT suspension can have a volumetric ratio of the second solvent to the first solvent of from about 1:1 to about 1:5, alternatively from about 1.2:1 to about 1:4, or alternatively from about 1.5:1 to about 1:3. As will be appreciated by one of skill in the art, and with the help of this disclosure, the PP solution and the f-MWNT dispersion can be combined in any amount effective to produce a desired volumetric ratio of the second solvent to the first solvent in the PP and f-MWNT suspension.

In an embodiment, the PP and f-MWNT suspension can have a weight ratio of f-MWNT to PP of from about 0.5:99.5 to about 80:20, alternatively from about 1:99 to about 60:40, or alternatively from about 10:90 to about 50:50. Without wishing to be limited by theory, a weight ratio of f-MWNT to PP of about 80:20 can be achieved when a single polymer molecule is coating a single f-MWNT.

In an embodiment, a method of making PP/f-MWNT can comprise a step of drying at least a portion of the PP and f-MWNT suspension to form the PP/f-MWNT. In an embodiment, drying at least a portion of the PP and f-MWNT suspension can occur under agitating, stirring, magnetic stirring, and the like, or combinations thereof, to provide for uniform solvent evaporation.

In an embodiment, drying at least a portion of the PP and f-MWNT suspension can occur at a temperature of from about from about 40° C. to about 80° C., alternatively from about from about 45° C. to about 75° C., or alternatively from about from about 50° C. to about 70° C.

In some embodiments, drying at least a portion of the PP and f-MWNT suspension can occur under vacuum. In other embodiments, drying at least a portion of the PP and f-MWNT suspension can occur at ambient pressure (e.g., without vacuum). In an embodiment, drying at least a portion of the PP and f-MWNT suspension can occur at a pressure of from about 50 mbar to about 1,013 mbar, alternatively from about 100 mbar to about 900 mbar, or alternatively from about 200 mbar to about 800 mbar.

In an embodiment, a method of making PP/f-MWNT can further comprise subjecting the PP/f-MWNT to grinding, crushing, milling, chopping, and the like, or combinations thereof, to form a PP/f-MWNT powder. As will be appreciated by one of skill in the art, and with the help of this disclosure, evaporating the solvent(s) from PP and f-MWNT suspension can produce rather non-uniform PP/f-MWNT particles (which can be clumped together), and as such these particles can be further converted to a powder of more uniform particle size, as might be desirable for further use of the PP/f-MWNT.

In an embodiment, the PP/f-MWNT powder is characterized by an average powder particle size of from about 10 μm to about 1 mm, alternatively from about 50 μm to about 750 μm, or alternatively from about 100 μm to about 500 μm.

In an embodiment, the PP/f-MWNT as described herein can comprise f-MWNT in an amount of from about 0.5 wt. % to about 80 wt. %, alternatively from about 1 wt. % to about 60 wt. %, or alternatively from about 10 wt. % to about 50 wt. %, based on the total weight of the PP/f-MWNT; and PP in an amount of from about 20 wt. % to about 99.5 wt. %, alternatively from about 40 wt. % to about 99 wt. %, or alternatively from about 50 wt. % to about 90 wt. %, based on the total weight of the PP/f-MWNT.

In an embodiment, the PP can coat the f-MWNT via non-covalent interactions. In an embodiment, the non-covalent interactions exclude hydrogen bonding. In some embodiments, the non-covalent interactions can comprise intermolecular CH-π interactions. Generally, non-covalent adsorption of electron-rich chemical compounds, such as compounds that are highly aromatic in nature, on the sidewall of CNT occurs most commonly through π-π interactions. However, non-covalent interactions can also occur between carbon-hydrogen groups and π system, for example CH-π interactions (e.g., CH stretching, CH bending vibration, $CH_2$ asymmetry bending vibration, $CH_3$ asymmetry bending vibration, $CH_2$ wagging, $CH_3$ symmetry bending vibration, $CH_2$ torsion motion, etc.), which can be identified through peak shifts in Fourier transform infrared spectroscopy (FTIR), as well as D band wavelength shifts in Raman spectroscopy. As will be appreciated by one of skill in the art, and with the help of this disclosure, CH-π interactions are relatively weak, are comparable to van der Waals forces, and have about one-tenth the strength of the hydrogen bond. Further, as will be appreciated by one of skill in the art, and with the help of this disclosure, CH-π interactions are characterized by a peak upshift in FTIR. Further, as will be appreciated by one of skill in the art, and with the help of this disclosure, CH-π interactions are characterized by a D band downshift in Raman spectroscopy.

In an embodiment, the PP can coat the f-MWNT via non-covalent interactions comprising intermolecular CH-π interactions, wherein the intermolecular CH-π interactions can be characterized by an upshift in the $CH_2$ torsion motion, when compared to the $CH_2$ torsion motion of the same PP used for coating the f-MWNT but in the absence of the f-MWNT; and wherein the upshift is an increase in the wavenumber of from about 4 $cm^{-1}$ to about 10 $cm^{-1}$, alternatively from about 4 $cm^{-1}$ to about 9 $cm^{-1}$, or alternatively from about 5 $cm^{-1}$ to about 8 $cm^{-1}$, as determined by FTIR.

In an embodiment, the PP can coat the f-MWNT via non-covalent interactions comprising intermolecular CH-π interactions, wherein the intermolecular CH-π interactions can be characterized by a downshift of D band, when compared to the D band of the same f-MWNT that have not been coated with PP; and wherein the downshift is a decrease in the wavenumber of from about 4 cm$^{-1}$ to about 10 cm$^{-1}$, alternatively from about 4 cm$^{-1}$ to about 9 cm$^{-1}$, or alternatively from about 5 cm$^{-1}$ to about 8 cm$^{-1}$, as determined by Raman spectroscopy. Without wishing to be limited by theory, when f-MWNT are coated by a polymer sheath (e.g., PP coating), strain is developed within the graphitic lattice of the MWNT that affects the vibration motion of the C—C bond due to the CH-π interactions, as suggested by the downshift in the D band.

In an embodiment, the f-MWNT of the PP/f-MWNT can have a diameter of from about 5 nm to about 200 nm, alternatively from about 10 nm to about 150 nm, or alternatively from about 20 nm to about 100 nm. As will be appreciated by one of skill in the art, and with the help of this disclosure, the dimensions (e.g., physical structure) of the f-MWNT are substantially the same as the dimensions of the p-MWNT, as the functionalization with nitric acid is performed under mild enough conditions to not alter the physical structure of the MWNT, while introducing carboxylic acid groups in the chemical structure.

In an embodiment, the f-MWNT of the PP/f-MWNT can have a length of from about 0.5 microns to about 1 mm, alternatively from about 1 micron to about 750 microns, or alternatively from about 5 microns to about 500 microns.

In an embodiment, the f-MWNT of the PP/f-MWNT can have from about 3 walls to about 100 walls, alternatively from about 5 walls to about 75 walls, or alternatively from about 8 walls to about 50 walls.

In an embodiment, the f-MWNT can comprise more carboxylic acid groups (—COOH) than the p-MWNT. Generally, the relative degree of functionalization of the MWNT can be estimated by Raman spectroscopy, for example by analyzing the intensity ratio of D-band ($I_D$) at about 1300 cm$^{-1}$ (due to disorder in the carbon lattice) to that of the G-band ($I_G$) at about 1590 cm$^{-1}$ (due to sp$^2$ longitudinal vibration of graphitic structure) in the Raman spectra. As will be appreciated by one of skill in the art, and with the help of this disclosure, a higher Raman $I_D/I_G$ ratio suggests a less perfect graphitic structure in the f-MWNT compared to that of p-MWNT due to the presence of —COOH groups on an f-MWNT side wall.

In an embodiment, the f-MWNT can be characterized by a ratio of intensity of D band to intensity of G band ($I_D/I_G$) that is increased by equal to or greater than about 20%, alternatively by equal to or greater than about 30%, or alternatively by equal to or greater than about 40%, when compared to an $I_D/I_G$ for p-MWNT that have not been treated with nitric acid, as determined by Raman spectroscopy.

In an embodiment, the PP of the PP/f-MWNT can be isotactic, syndiotactic, atactic, or combinations thereof. Tacticity is a property of polymers comprising regular substituents (originating in the monomer(s) used for forming the polymer) on the polymer chain. When the substituents are arranged in an irregular, random fashion, the polymer is atactic. When the substituents are all on the same side of the chain, the polymer is isotactic. When the substituents alternate regularly from one side of the chain to the other, the polymer is syndiotactic. Isotactic and syndiotactic polymers are referred to as stereoregular, that is, polymers having an ordered arrangement of pendant groups along the chain. For example, in isotactic PP, all the methyl (—CH$_3$) groups are arranged along the same side of the polymer chain. Generally, stereoregular polymers are usually high-strength materials owing to an uniform structure leading to close packing of the polymer chains, which can result in a high degree of crystallinity.

In an embodiment, the PP of the PP/f-MWNT can be characterized by an isotacticity of from about 0% to 100%, alternatively from about 90% to 100%, alternatively from about 95% to 100%, alternatively from about 96% to about 99%, or alternatively from about 92% to about 96%, as measured by $^{13}$C nuclear magnetic resonance ($^{13}$C NMR) spectroscopy. For example, for high stiffness applications (e.g., pipe extrusion, injection molding, thin wall injection molding) the PP can be characterized by an isotacticity of from about 95% to 100%, or alternatively from about 96% to about 99%. As another example, for film applications, the PP can be characterized by an isotacticity of from about 92% to about 96%.

In an embodiment, the PP of the PP/f-MWNT can be characterized by a melt flow index (MFI) of from about 0.1 dg/min to about 250 dg/min, alternatively from about 0.1 dg/min to about 200 dg/min, alternatively from about 0.1 dg/min to about 1 dg/min, alternatively from about 1 dg/min to about 10 dg/min, or alternatively from about 10 dg/min to about 200 dg/min, as determined in accordance with ISO 1133 under a load of 2.16 kg. For example, for pipe extrusion applications the PP can be characterized by an MFI of from about 0.1 dg/min to about 1 dg/min; while for injection molding, the PP can be characterized by an MFI of from about 10 dg/min to about 200 dg/min.

In an embodiment, the PP of the PP/f-MWNT can be characterized by a molecular weight distribution (MWD) of from about 1 to about 10, alternatively from about 2 to about 8, alternatively from about 2 to about 4, or alternatively from about 4 to about 8, as determined in accordance with size exclusion chromatography/differential viscometry (SEC/DV). Generally, MWD, also known as polydispersity index, is a measure of the distribution of molecular mass in a given polymer sample. MWD can be calculated by dividing the weight average molecular weight by the number average molecular weight. As an example, for fibers applications the PP can be characterized by a MWD of from about 2 to about 4; while for injection molding, the PP can be characterized by a MWD of from about 4 to about 8.

In an embodiment, the PP/f-MWNT can have a PP coating thickness of from about 1 nm to about 10 nm, alternatively from about 1.5 nm to about 9.5 nm, or alternatively from about 2 nm to about 9 nm. In some embodiments, the PP coating can have an uniform thickness for a given discrete (e.g., individual) MWNT. In other embodiments, the PP coating can have a varying thickness for a given discrete MWNT.

In an embodiment, the PP coating can be characterized by a solubility in aromatic hydrocarbon solvents (e.g., second solvent) at 70° C. that is decreased by equal to or greater than about 25%, alternatively by equal to or greater than about 30%, or alternatively by equal to or greater than about 35%, when compared to a solubility in aromatic hydrocarbon solvents at 70° C. of the same PP used for coating the f-MWNT but in the absence of the f-MWNT. As will be appreciated by one of skill in the art, and with the help of this disclosure, due to the small size of the PP/f-MWNT, it would be expected that the PP coating would more soluble in aromatic hydrocarbon solvents, owing to an increase surface contact area between the PP coating of the PP/f-MWNT and the aromatic hydrocarbon solvent. Without wishing to be limited by theory, the non-covalent interactions (e.g., CH-π interactions) between the PP and the f-MWNT lead to an increased chemical stability of the PP coating (e.g., decrease the solubility of the PP in aromatic hydrocarbon solvents, increased thermal decomposition temperature, etc.). When comparing a property of the PP used for coating the f-MWNT but in the absence of the f-MWNT, a comparison is made between a quantification of a designated property of the PP polymer prior to being used as a coating on the f-MWNT (e.g., the PP prior to being placed in solution) and a quantification of the same property under the same testing conditions for the PP after the PP has been applied as a coating to the f-MWNT (e.g., the PP as present in the final PP/f-MWNT product), and such comparison may indicate a difference or change in the quantified property.

In an embodiment, the PP of the PP/f-MWNT can be characterized by a thermal decomposition temperature that is increased by equal to or greater than about 10° C., alternatively equal to or greater than about 15° C., or alternatively equal to or greater than about 20° C. when compared to a thermal decomposition temperature of the same PP used for coating the f-MWNT but in the absence of the f-MWNT, as determined by thermogravimetric analysis (TGA) under a nitrogen atmosphere. Generally, the thermal decomposition temperature of a substance is the temperature at which the substance chemically decomposes.

In an embodiment, the PP of the PP/f-MWNT can be characterized by a crystallization temperature that is increased by equal to or greater than about 2° C., alternatively equal to or greater than about 3° C., or alternatively equal to or greater than about 4° C. when compared to a crystallization temperature of the same PP used for coating the f-MWNT but in the absence of the f-MWNT, as determined by differential scanning calorimetry (DSC) thermal analysis in accordance with ASTM E794-06. Generally, the crystallization temperature of a polymer refers to the temperature at which polymer crystals form.

In an embodiment, the PP of the PP/f-MWNT can be characterized by a melting temperature that is increased by equal to or greater than about 1° C., alternatively equal to or greater than about 2° C., or alternatively equal to or greater than about 3° C. when compared to a melting temperature of the same PP used for coating the f-MWNT but in the absence of the f-MWNT, as determined by DSC thermal analysis in accordance with ASTM E794-06. Generally, the melting temperature of a polymer refers to a temperature where the polymer transition from a crystalline or semi-crystalline phase to a solid amorphous phase.

In an embodiment, the PP/f-MWNT can comprise discrete f-MWNT coated with PP (e.g., discrete PP/f-MWNT). For purposes of the disclosure herein, the term "discrete f-MWNT" refers to an individual f-MWNT (as opposed to two or more f-MWNT touching each other or adjacent to each other under a PP coating) that does not contact any other f-MWNT under a PP coating. In a discrete f-MWNT, no uncoated portion of a given f-MWNT is in direct contact with an uncoated portion of another f-MWNT. The PP/f-MWNT can comprise non-discrete f-MWNT coated with PP (non-discrete PP/f-MWNT), for example two or more f-MWNT touching each other or adjacent to each other under a PP coating (e.g., an uncoated portion of a given f-MWNT is in direct contact with an uncoated portion of another f-MWNT).

In an embodiment, the PP/f-MWNT can comprise equal to or greater than about 50 wt. %, alternatively equal to or greater than about 60 wt. %, or alternatively equal to or greater than about 75 wt. % discrete f-MWNT coated with PP (e.g., discrete PP/f-MWNT), based on the total weight of the f-MWNT. In an embodiment, a discrete PP/f-MWNT can have a diameter of from about 6 nm to about 210 nm, alternatively from about 15 nm to about 175 nm, or alternatively from about 25 nm to about 150 nm.

In an embodiment, PP/f-MWNT can be produced by a process comprising the steps of (a) contacting pristine multiwall carbon nanotubes (p-MWNT) with nitric acid to produce f-MWNT, wherein the p-MWNT are refluxed in nitric acid, and wherein the f-MWNT have a diameter of from about 10 nm to about 30 nm; (b) contacting at least a portion of the f-MWNT with butanol to form a f-MWNT suspension; (c) sonicating at least a portion of the f-MWNT suspension to form a f-MWNT dispersion; (d) contacting PP with xylene to form a PP solution, under agitating, stirring, magnetic stirring, and the like, or combinations thereof, and at a temperature of about 120° C.; (e) adding dropwise at least a portion of the PP solution to at least a portion of the f-MWNT dispersion under agitating, stirring, magnetic stirring, and the like, or combinations thereof, to form a PP and f-MWNT suspension; and (f) drying at least a portion of the PP and f-MWNT suspension under agitating, stirring, magnetic stirring, and the like, or combinations thereof; at a temperature of from about from about 40° C. to about 80° C.; and at a pressure of from about 50 mbar to about 1,013 mbar; to form the PP/f-MWNT. In such embodiment, the PP/f-MWNT can comprise f-MWNT and PP, wherein the PP coats the f-MWNT via non-covalent interactions, wherein the non-covalent interactions comprise intermolecular CH-π interactions, and wherein the non-covalent interactions exclude hydrogen bonding.

In an embodiment, PP/f-MWNT can comprise f-MWNT in an amount of from about 0.5 wt. % to about 10 wt. %, based on the total weight of the PP/f-MWNT, and PP in an amount of from about 90 wt. % to about 99.5 wt. %, based on the total weight of the PP/f-MWNT; wherein the PP coats the f-MWNT via non-covalent interactions; wherein the PP is characterized by an isotacticity of from about 90% to 100%; wherein the f-MWNT have a diameter of from about 5 nm to about 20 nm, a length of from about 0.5 microns to about 20 microns, and from about 5 walls to about 15 walls; and wherein a PP coating has thickness of from about 1 nm to about 10 nm. In an embodiment, the PP/f-MWNT can be used for modifying PP.

In an embodiment, the PP/f-MWNT comprising f-MWNT and PP, wherein the PP coats the f-MWNT via non-covalent interactions, and methods of making same, as disclosed herein can advantageously display improvements in one or more composition characteristics when compared to an otherwise similar composition comprising PP and MWNT, wherein the PP coats the MWNT via interactions other than non-covalent interactions.

In an embodiment, the PP/f-MWNT comprising f-MWNT and PP, wherein the PP coats the f-MWNT via non-covalent interactions, can advantageously display an increased thermal degradation temperature of the PP coating, when compared to a thermal degradation temperature of the same PP used for coating the f-MWNT but in the absence of the f-MWNT.

In an embodiment, the PP/f-MWNT comprising f-MWNT and PP, wherein the PP coats the f-MWNT via non-covalent interactions, can advantageously display increased solvent resistance (e.g., lower solubility) of the PP coating when compared to a solvent resistance of the same PP used for coating the f-MWNT but in the absence of the f-MWNT.

In an embodiment, the PP/f-MWNT comprising f-MWNT and PP, wherein the PP coats the f-MWNT via non-covalent interactions, can advantageously display both increased crystallization temperature and increased melting temperature of the PP coating, when compared to a crystallization temperature and a melting temperature, respectively, of the same PP used for coating the f-MWNT but in the absence of the f-MWNT.

Figure 18A:
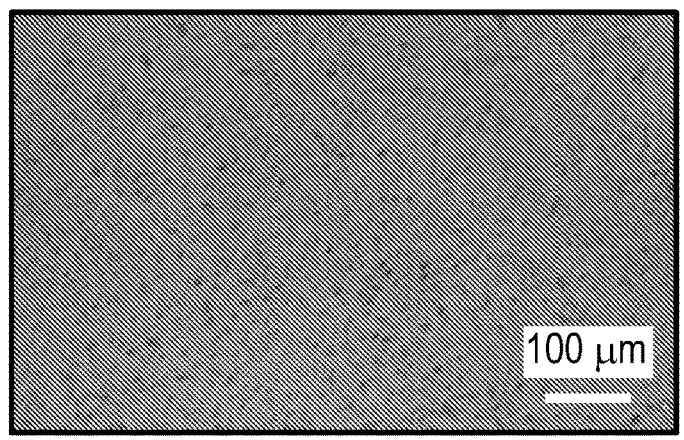
FIGS. 18A through 18C display optical micrographs of PP/MWNT nanocomposites at 0.1 wt. % MWNT loading using (a) a PP/f-MWNT master batch; (b) a MA-g-PP/f-MWNT master batch; and (c) p-MWNT.
Figure 18B:
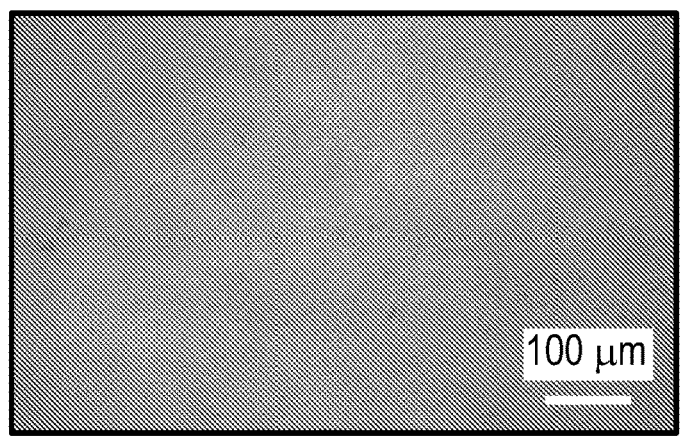
Figure 18C:
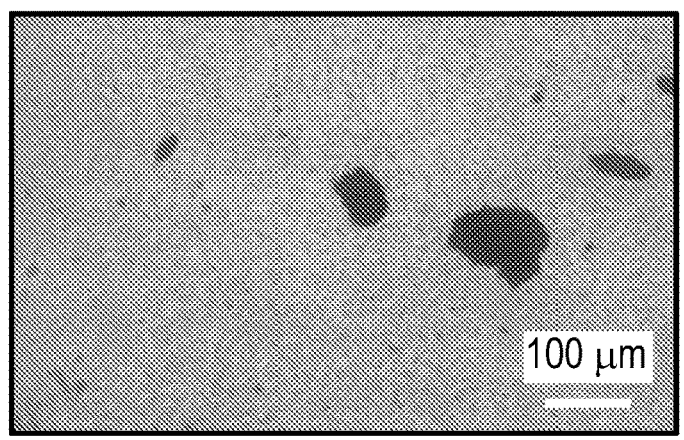

In an embodiment, the PP/f-MWNT comprising f-MWNT and PP, wherein the PP coats the f-MWNT via non-covalent interactions, can advantageously allow for improved f-MWNT dispersion in PP-MWNT nanocomposites, when compared to dispersion of p-MWNT in otherwise similar PP-MWNT nanocomposites, as shown in FIG. 18A vs. FIG. 18C. In FIG. 18A, a polymeric nanocomposite (0.1 wt. % f-MWNT) was prepared by micro-compounding PP with PP/f-MWNT. In FIG. 18C, a polymeric nanocomposite (0.1 wt. % p-MWNT) was prepared by micro-compounding PP with p-MWNT. The former displayed better MWNT dispersion in the PP matrix. Additional advantages of the PP/f-MWNT comprising f-MWNT and PP, wherein the PP coats the f-MWNT via non-covalent interactions, and methods of making same, as disclosed herein can be apparent to one of skill in the art viewing this disclosure.

EXAMPLES

The subject matter having been generally described, the following examples are given as particular embodiments of the disclosure and to demonstrate the practice and advantages thereof. It is understood that the examples are given by way of illustration and are not intended to limit the specification of the claims to follow in any manner.

Materials.

MWNT (SMW200) used in this study were obtained from SouthWest NanoTechnologies, Inc. (SWeNT), OK. Average number of walls (9 to 10) and average diameter (12±3 nm) were determined from full width at half maximum (FWHM) of 2θ~25.8° integrated peak from wide angle X-ray diffraction (WAXD) and scanning electron microscopy (SEM), respectively. Impurity content in MWNT was about 2% as determined by thermogravimetric analysis (TGA) in air and a length of the tubes was about 4 μm according to the supplier. For functionalization and dispersion of MWNT, nitric acid (ACS reagent, 70% purchased from Sigma-Aldrich) and butanol (99.9% purchased from Sigma-Aldrich) were used, respectively. Isotactic PP homopolymer (isotacticity: 97% and polydispersity index: 5) was provided by SABIC, Geleen, Netherlands. Maleic anhydride grafted PP (MA-g-PP) (Epolene E-43 polymer, $M_w$~9100 g/mole, acid number of 45 mg KOH/g) was purchased from Westlake Chemical Corporation, TX. Xylene (99.9% purchased from Sigma-Aldrich) was used as aromatic hydrocarbon solvent.

Characterization.

Scanning electron microscopy (SEM) was performed on a Zeiss Ultra 60 FE-SEM at an accelerating voltage of 2 kV. Average diameter of p-MWNT and polymer coated MWNT was measured using ImageJ software from 40-50 measurements. For transmission electron microscopy (TEM) characterization, a few drops of f-MWNT/polymer solution mixture slurry were put on a holey carbon coated copper grid. TEM images were obtained using a probe corrected scanning/transmission electron microscope JEOL JEM-ARM200cF (JEOL, Ltd, Tokyo, Japan) operated at 80 kV. WAXD was performed using a Rigaku MicroMax-002 beam generator (Cu Kα λ=0.1542 nm, operating voltage and current 45 kV and 0.65 mA) equipped with R-axis IV++ detector. Raman spectra were collected using a HORIBA XploRA ONE (λ=785 nm) spectrometer. FTIR spectra of p-MWNT, f-MWNT, PP, MA-g-PP, and PP/f-MWNT mixed with potassium bromide (KBr) pellets were recorded using a PerkinElmer Spectrum One FTIR spectrometer with a resolution of 4 cm$^{-1}$. Dynamic frequency sweep test was performed at 200° C. in the range of 0.1 to 500 rad/s using parallel-plate geometry (plate diameter 25 mm and the gap between the plates is 1 mm). For studying thermal degradation, TGA study was carried out at a heating rate of 10° C./min under nitrogen using a TA Instrument Q500. For DSC study (using TA Instrument Q100), heating rate was 10° C./min or 2.5° C./min, and samples were heated from room temperature to 220° C. and then cooled and re-heated at the same rate. Crystallization temperature ($T_c$) and melt temperature ($T_m$) were derived from the 1st cooling cycle and the 2nd heating cycles, respectively, in accordance with ASTM E794-06. Crystallinity was calculated from enthalpy of melting assuming the enthalpy of melting for 100% crystalline PP to be 207 J/g. Baselines for integration under crystallization and melting peaks were chosen in the range of 90 to 140° C. and 105 to 180° C., respectively.

Example 1 f-MWNT were prepared as follows. MWNT were functionalized using nitric acid. Pristine MWNT (p-MWNT) were homogenized in deionized water (DI water) for 20 min at 7000 rpm followed by sonication (Branson bath sonicator 3510R-MT, 100 W, 42 kHz) in 10 M nitric acid for 30 min. The mixture was refluxed at 120° C. (oil-bath temperature) for 24 hours and then repeatedly centrifuged and washed in deionized (DI) water until the pH value reached that of the DI water. The resulting f-MWNT suspension was filtered and washed using butanol followed by 48 hours of sonication at 5 mg/dl concentration, to produce a f-MWNT dispersion. FIGS. 1A and 1B summarize the MWNT functionalization, and PP/f-MWNT preparation: (a) p-MWNT was treated with 10 M HNO$_3$ at 120° C. for 24 hours; and (b) f-MWNT was sonicated in butanol for 48 hours after which MA-g-PP/xylene or PP/xylene solution was added drop-by-drop into the f-MWNT/butanol dispersion at 60° C. followed by drying. For purposes of the disclosure herein, a MWNT that can be used for preparing polymer nanocomposites can also be referred to as "master batch," such as p-MWNT master batch, f-MWNT master batch, PP/f-MWNT master batch, MA-g-PP/f-MWNT master batch, etc.

Figure 2A:
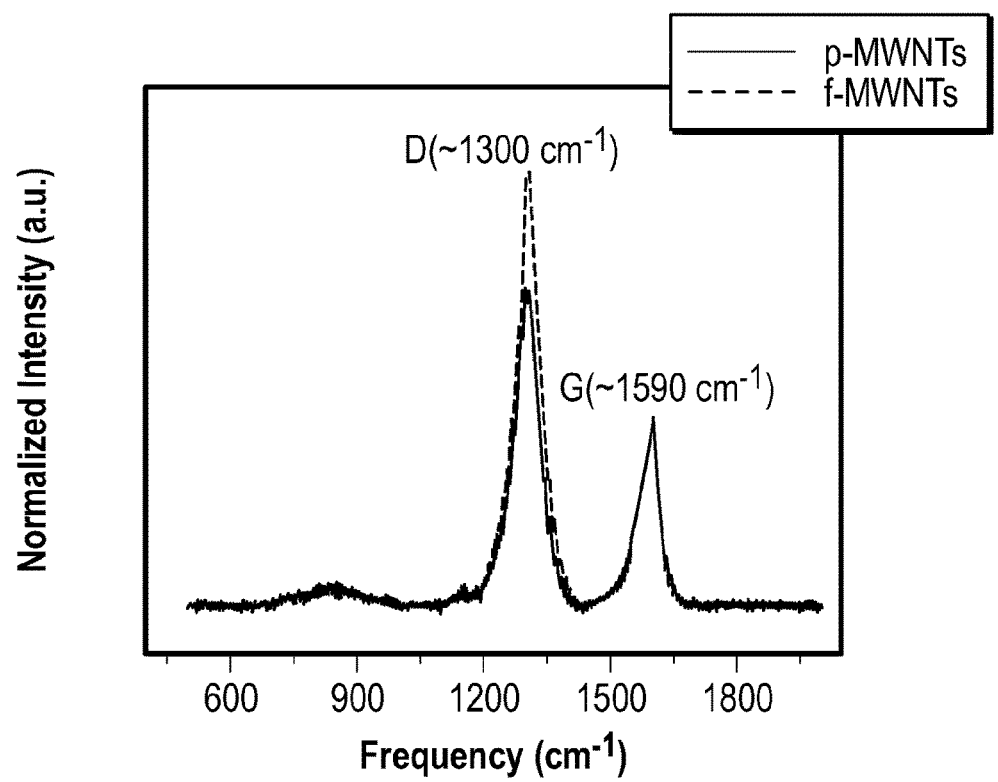
FIGS. 2A and 2B display (a) Raman spectra and (b) wide angle X-ray diffraction (WAXD) of pristine MWNT (p-MWNT) and f-MWNT.

Generally, carboxyl groups (—COOH) can be introduced on a carbon nanotube surface through nitric acid treatment to promote its solubility in polar solvents such as butanol. While increasing the treatment time, temperature, or other harsher reaction conditions can introduce more functional groups on MWNT, the nanotubes can also be fragmented or unzipped under such harsher treatment conditions. A relative degree of functionalization of the MWNT can be estimated via Raman spectroscopy, by the intensity ratio of D-band ($I_D$) at ~1300 cm$^{-1}$ (due to disorder in the carbon lattice) to that of the G-band ($I_G$) at ~1590 cm$^{-1}$ (due to sp$^2$ longitudinal vibration of graphitic structure) in the Raman spectra (FIG. 2A). Table 1 displays $I_D/I_G$ ratios from Raman spectra, crystal sizes derived from WAXD (002) integrated peak using Scherrer equation, and the corresponding number of MWNT walls assuming 0.34 nm interlayer separation.

TABLE 1

| Sample | $I_D/I_G$ (average of 5 different measurements) | (002) Crystal size (nm) | Number of walls |
|---|---|---|---|
| p-MWNT | 1.69 ± 0.05 | 3.17 | 9.2 |
| f-MWNT | 2.32 ± 0.05 | 3.30 | 9.6 |

Figure 2B:
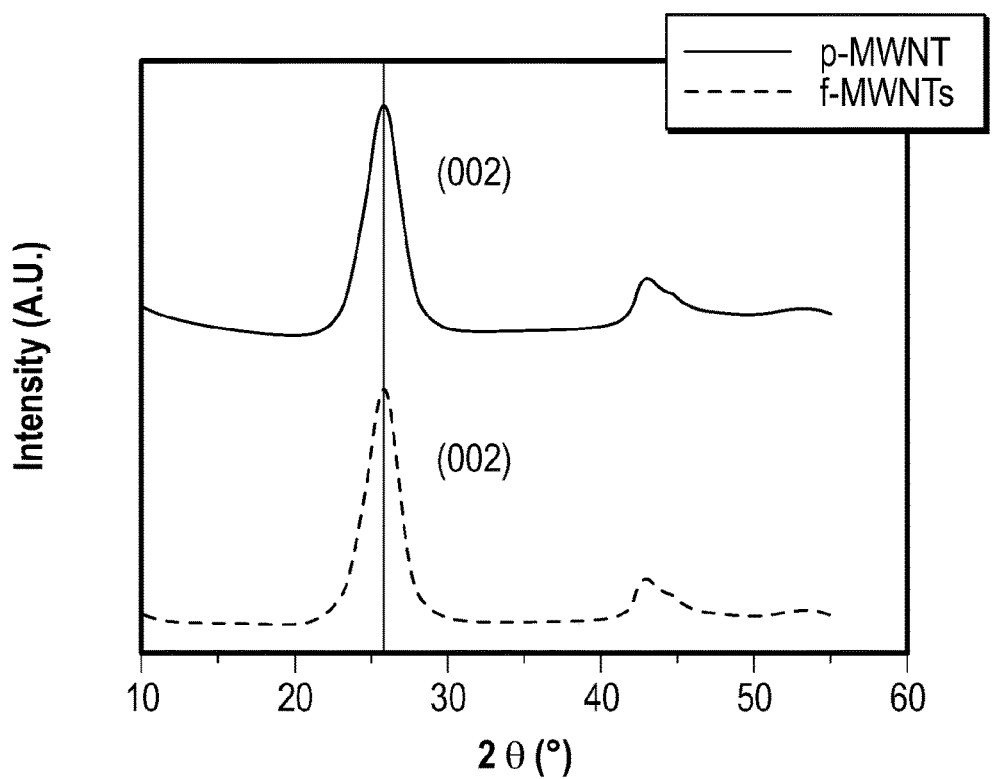
Figure 3:
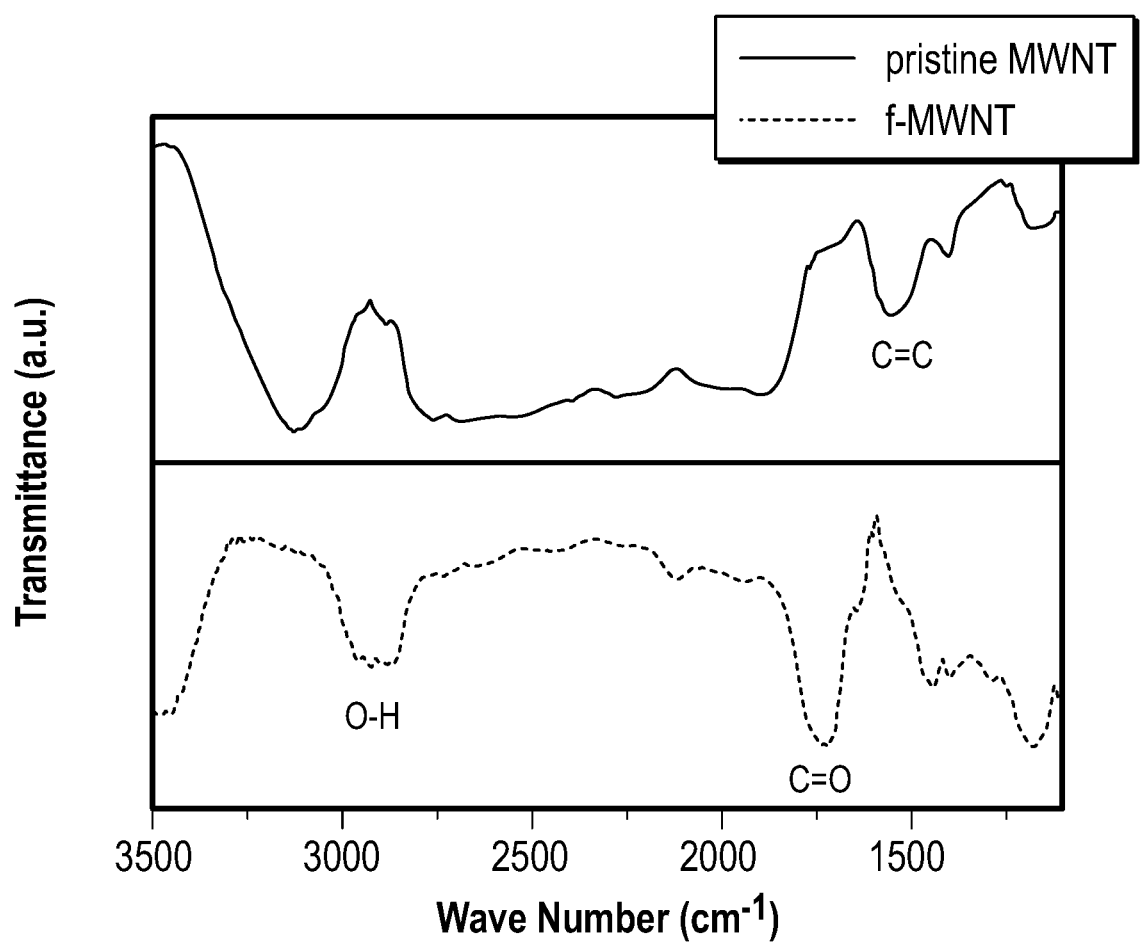
FIG. 3 displays Fourier transform infrared spectroscopy (FTIR) spectra of p-MWNT and f-MWNT.
Figure 4A:
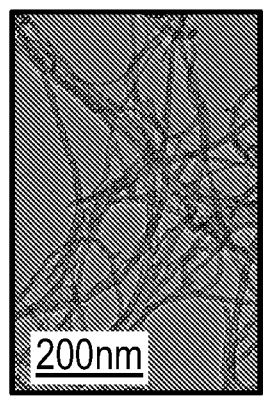
FIGS. 4A through 4H display transmission electron microscopy (TEM) images of p-MWNT and f-MWNT, as well as optical photographs of p-MWNT, f-MWNT, and PP/f-MWNT, dried and in suspensions and/or dispersions.
Figure 4B:
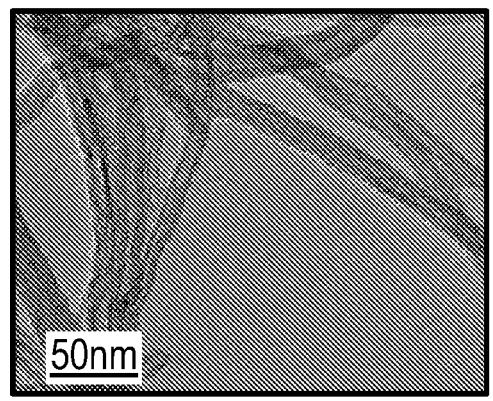
Figure 4C:
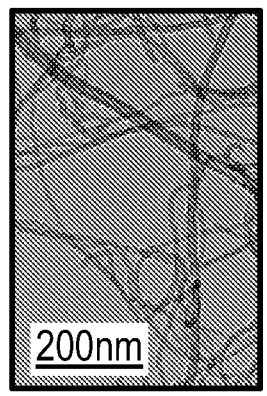
Figure 4D:
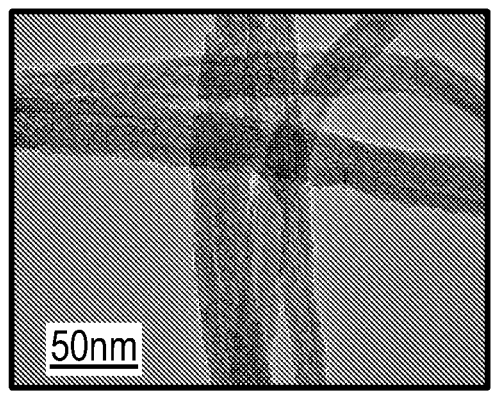
Figure 4E:
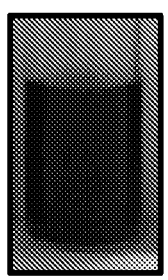
Figure 4F:
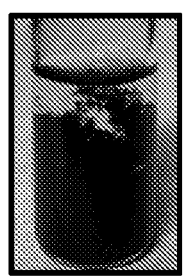

Higher Raman $I_D/I_G$ ratio (Table 1) suggests a less perfect graphitic structure in f-MWNT compared to that of p-MWNT due to the presence of —COOH groups on f-MWNT side wall. The presence of carboxylic acid C=O (~1700 cm$^{-1}$) and OH stretch (~2800-3000 cm$^{-1}$) in f-MWNT also suggests the successful functionalization from nitric acid treatment, as I can be seen from the FTIR spectra in FIG. 3. Average number of walls in p-MWNT and f-MWNT were determined from the WAXD (002) FWHM using the Scherrer equation (FIG. 2B and Table 1) and the average number of walls in p-MWNT and f-MWNT were found to be the same within experimental error. This shows that the process of nitric acid treatment and the introduction of the functional groups in the current experiments have not destroyed even a single wall of the MWNT. FIGS. 4A through 4H display TEM images of (a,b) p-MWNT, (c,d) f-MWNT; photographs of (e) f-MWNT/butanol, and (f) p-MWNT/butanol dispersions in vials after 48 hours of sonication; photographs of PP/f-MWNT (master batch) prepared (g) via gradual evaporation of solvents (xylene and butanol) and (h) via precipitation using methanol. A comparison of the TEM images of p-MWNT (FIGS. 4A and B) to those of the f-MWNT (FIGS. 4C and D) also confirms that there is no significant damage on MWNT sidewall upon nitric acid treatment under conditions used herein. Sonicated f-MWNT/butanol dispersions (at 5 mg/dl) were found to be very stable (there was no noticeable phase separation), when kept at room temperature over several months (FIG. 4E). By comparison, similarly sonicated p-MWNT/butanol system did not exhibit good dispersion (FIG. 4F).

Example 2

PP/f-MWNT or MA-g-PP/f-MWNT were prepared from the f-MWNT of Example 1 as follows. PP and MA-g-PP master batches containing 5 wt. % f-MWNT were prepared in butanol/xylene solvent mixture. A f-MWNT/butanol dispersion (5 mg/dl) was heated to 60° C. while PP or MA-g-PP was dissolved in xylene at 120° C. (190 mg/dl) and added dropwise into the former with a final xylene to butanol ratio equaled to 1:2. The solution was dried at 60° C. under vacuum while stirring in the reactor to obtain PP/f-MWNT or MA-g-PP/f-MWNT master batches containing 5 wt. % f-MWNT. The two master batches were converted to powders using mortar and pestle.

FIGS. 5A through 5F show SEM images of PP and MA-g-PP coated f-MWNT. FIGS. 5A through 5F displays SEM images of MA-g-PP/f-MWNT and PP/f-MWNT master batches at various stages of solvent evaporation: (a) and (b) right after the mixing of polymer solution in f-MWNT dispersion (stage 1), (c) and (d) when 80% of the solvent had been removed by evaporation (stage 2), (e) and (f) when all solvent had been removed by evaporation (stage 3). Scale bar represents 30 nm in FIGS. 5A through 5F. The solvent evaporation refers to the timing of when the sample was removed from the reactor. As will be appreciated by one of skill in the art, and with the help of this disclosure, for SEM observation, ultimately all solvent was removed. However, after the sample removal from the reactor, the solvent removal was without any stirring. Thus, during stage 1 and stage 2, there was lower probability of polymer coating on the carbon nanotubes than during stage 3.

The average diameter of PP coated f-MWNT was 23 nm, and that of MA-g-PP coated f-MWNT was 26 nm, as displayed in Table 2.

TABLE 2

| Sample | Diameter (nm) |
| --- | --- |
| p-MWNT: | 12 ± 3 |
| PP/f-MWNT master batch (stage 1) | 16 ± 6 |
| PP/f-MWNT master batch (stage 2) | 19 ± 4 |
| PP/f-MWNT master batch (stage 3) | 23 ± 5 |
| MA-g-PP/f-MWNT master batch (stage 1) | 20 ± 3 |
| MA-g-PP/f-MWNT master batch (stage 2) | 22 ± 4 |
| MA-g-PP/f-MWNT master batch (stage 3) | 26 ± 6 |

Note:
Various sample stages as defined for FIGS. 5A through 5F.

TABLE 3

| Sample | Average Diameter (nm) |
| --- | --- |
| f-MWNT | 15 ± 3 |
| PP/f-MWNT master batch | 23 ± 5 |
| PP/f-MWNT master batch washed with xylene at 70° C. | 20 ± 3 |
| PP/f-MWNT master batch washed with xylene at 120° C. | 17 ± 4 |

Through SEM and TEM imaging, a 4 to 5 nm thick layer of PP and MA-g-PP polymer coating was observed on the MWNT sidewall in the two master batches. Based on a 15 nm diameter of the f-MWNT (Table 3), the average coating thickness was about 4 nm for PP and about 5 nm for MA-g-PP. This coating was achieved while the solvent was slowly evaporated at a controlled temperature while stirring. TEM images (FIGS. 6A through 6D) also confirmed the presence of polymer coating on f-MWNT and showed that there was no gap between nanotubes and the polymer, and that f-MWNT were fully wetted and encapsulated by the two polymers, PP or MA-g-PP, used experimentally. FIGS. 6A through 6D displays TEM images of (a,b) PP/f-MWNT and (c,d) MA-g-PP/f-MWNT master batches. Both PP and MA-g-PP form continuous coatings on f-MWNT, suggesting interaction between nanotubes and the polymers. There appears to be no gap between polymer and f-MWNT. Images (6A) and (6C) as well as the arrow in (6B) demonstrate the ability of polymer coating on separating adjacent MWNT.

Figure 4G:
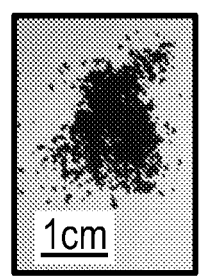
Figure 4H:
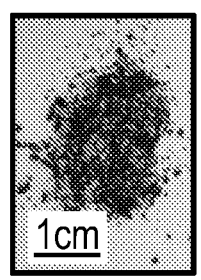

The resulting PP/f-MWNT master batch was a black powder (FIG. 4G). In an alternative procedure, when polymer (PP or MA-g-PP)/f-MWNT/butanol/xylene system was precipitated by introducing methanol (rather than removing the solvent by slow evaporation), f-MWNT and the polymers were phase separated. This could be easily seen by white powder (polymer) and black particles (f-MWNT) (FIG. 4H). Such coagulation precipitation is one of the common solution-based approaches for preparing PP composites, however, the fast dissolution of CNT-PP precipitants cannot provide enough time for the development of a homogenous PP layer on CNT.

Example 3

The stability of the interfacial polymer layer on polymer coated MWNT was investigated for both PP/f-MWNT and MA-g-PP/f-MWNT, which were prepared as described in Example 2.

Figure 7A:
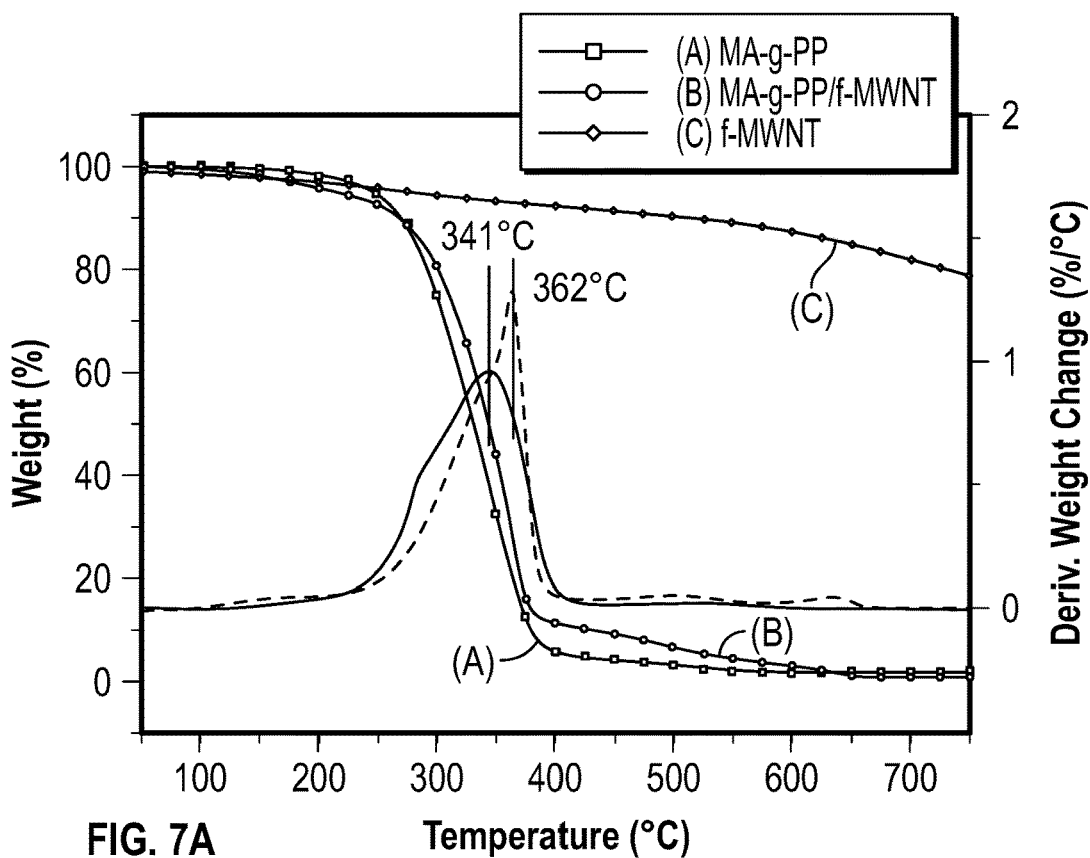
FIGS. 7A and 7B display thermogravimetric analysis (TGA) under nitrogen (a) for MA-g-PP and MA-g-PP/f-MWNT; and (b) for PP and PP/f-MWNT.
Figure 7B:
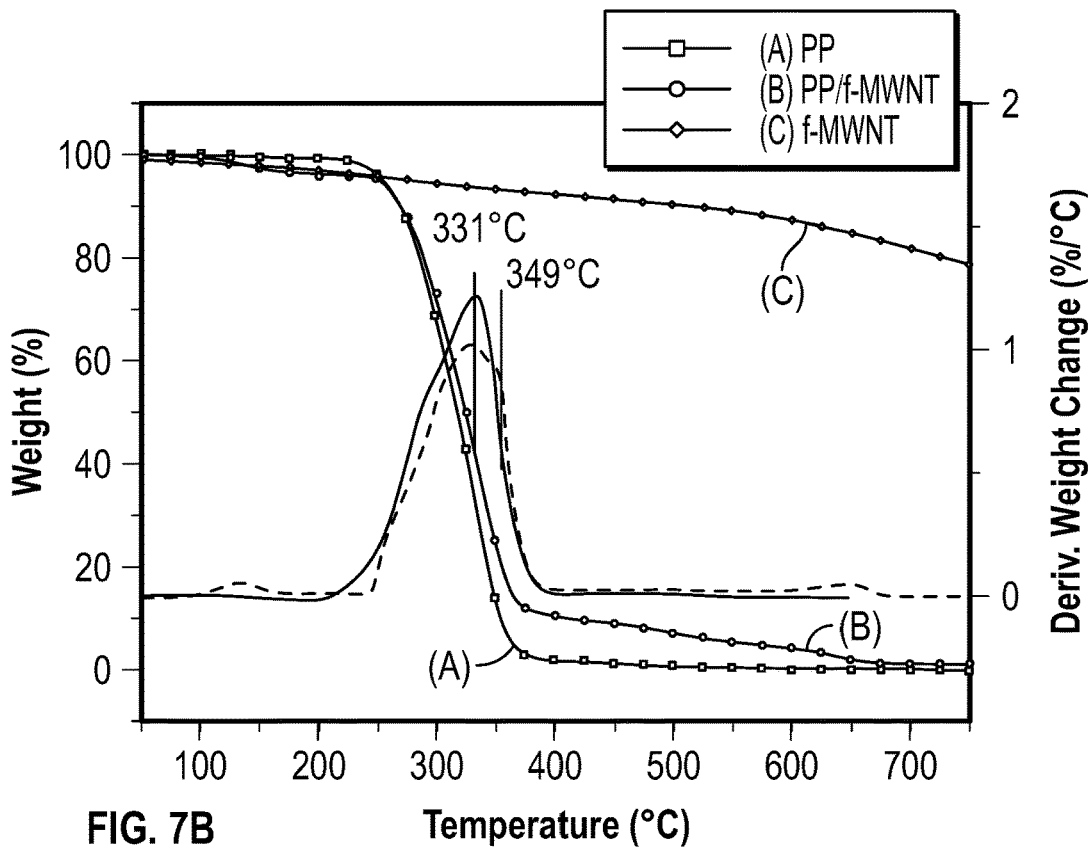
Figure 8:
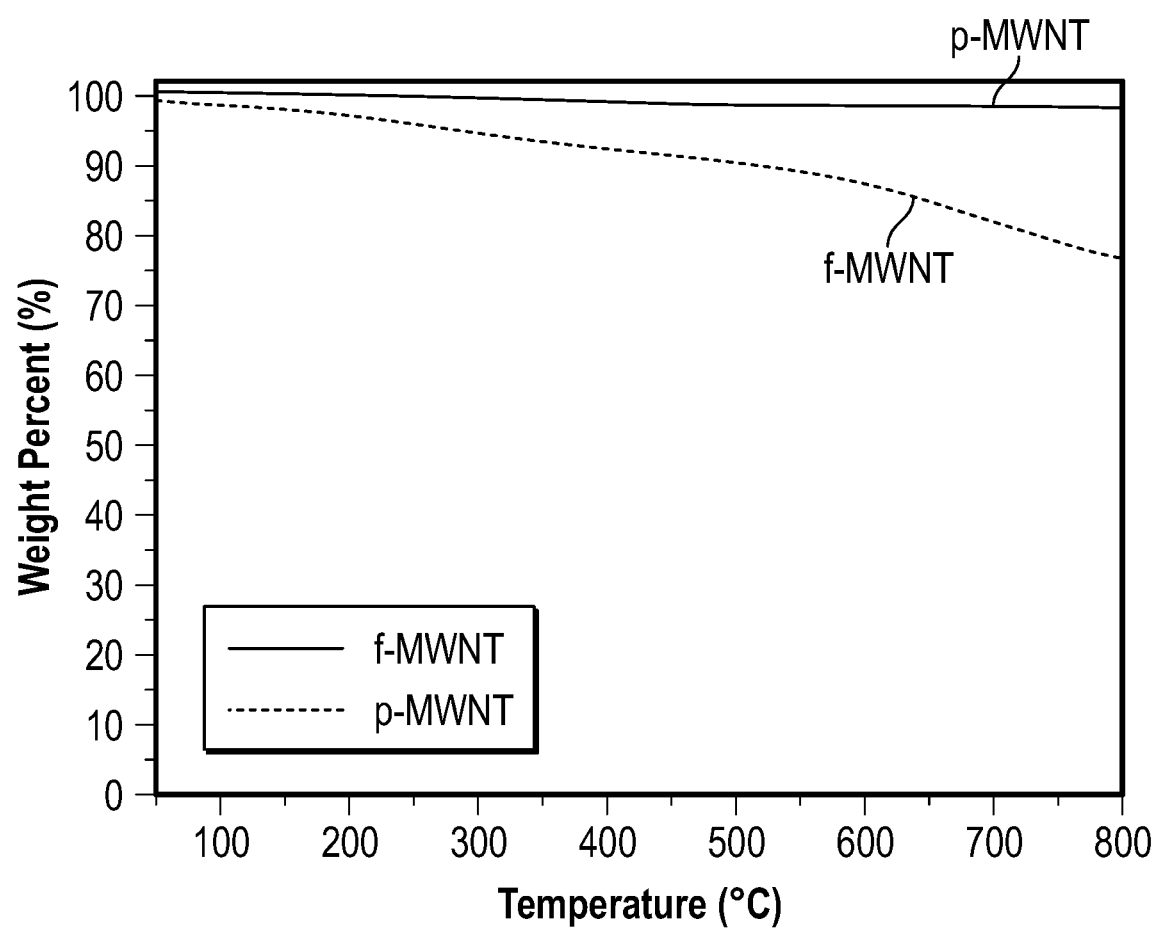
FIG. 8 displays TGA under nitrogen for p-MWNT and f-MWNT.

Thermal stability of MWNT, PP/f-MWNT and MA-g-PP/f-MWNT was investigated by TGA in nitrogen (FIGS. 7A and 7B, FIG. 8). The weight loss from 150 to 550° C. in the case of f-MWNT can be attributed to the loss of functional groups, and the loss of the nanotubes catalyzed by the loss of functional groups. Above 550° C., combustion of f-MWNT can be facilitated by the defects generation through breaking of the carbon double bonds. PP and MA-g-PP powders samples (without nanotubes), that underwent similar solution preparation and drying process as the two master batches (e.g., PP/f-MWNT and MA-g-PP/f-MWNT) were used as the control samples for studying the thermal degradation behaviors of the two master batches. The degradation temperatures ($T_d$) of the PP and MA-g-PP without nanotubes were at 331 and 341° C., respectively (FIGS. 7A and B). In the MA-g-PP/f-MWNT master batch, $T_d$ was 21° C. higher (at 362° C.) than that in MA-g-PP without nanotubes (FIG. 7A). Similarly, enhancement in $T_d$ was also observed in PP/f-MWNT master batch where a shoulder peak in the derivative plot was observed at 349° C. as compared to the peak degradation temperature of 331° C. for PP without nanotubes (FIG. 7B). Increase in thermal stability of polymer-CNT composite can be attributed to number of factors. Without wishing to be limited by theory, the barrier effect of CNT network in the nanocomposite can hinder the diffusion of the degradation products from the bulk polymer to the gas phase. Further, without wishing to be limited by theory, the interfacial interaction between CNT and polymer can restrict the thermal motion of macromolecules that increases the degradation activation energy. Further, without wishing to be limited by theory, CNT can demonstrate antioxidant effect due to their strong radical accepting ability that can decelerate the degradation process. Therefore, the enhanced $T_d$ of PP/f-MWNT and MA-g-PP/f-MWNT compared with the control samples can be attributed to the combined effect of well dispersed f-MWNT in the polymer matrix as well as to the interphase polymer layer on f-MWNT.

Figure 9A:
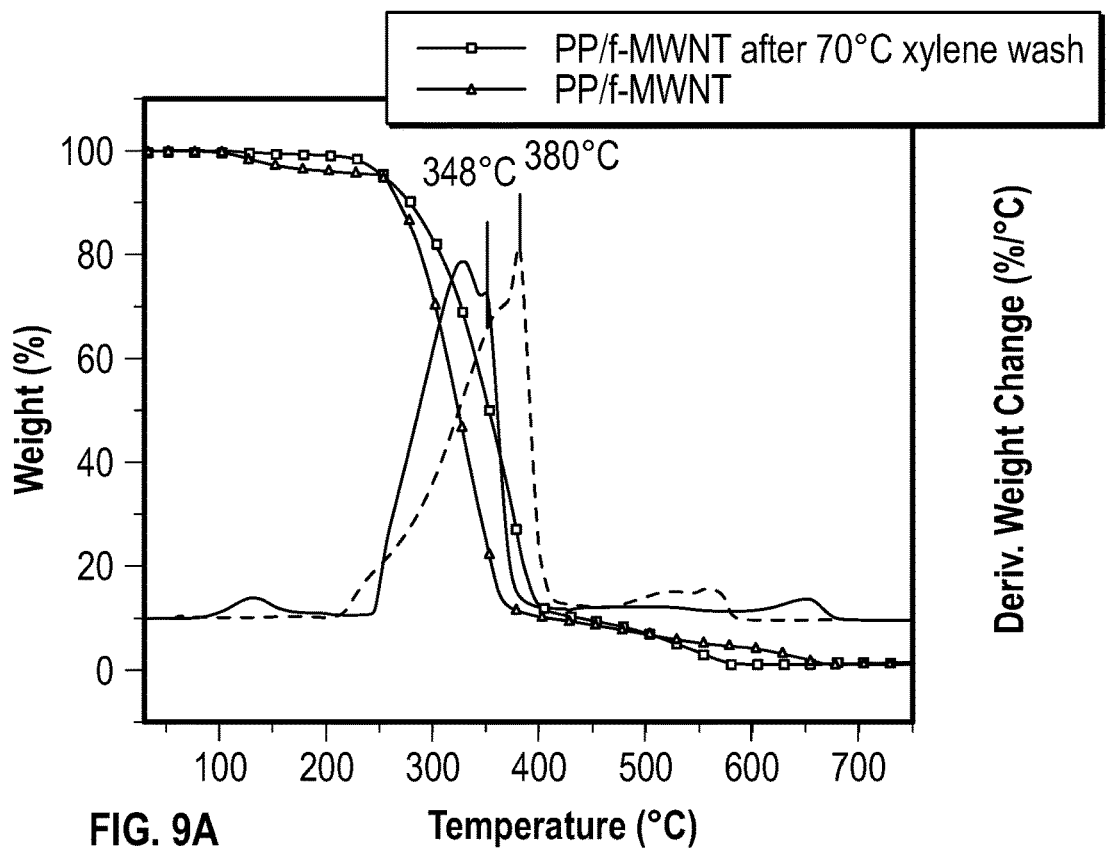
FIGS. 9A and 9B display TGA under nitrogen for (a) PP/f-MWNT and (b) MA-g-PP/f-MWNT before and after xylene wash.
Figure 9B:
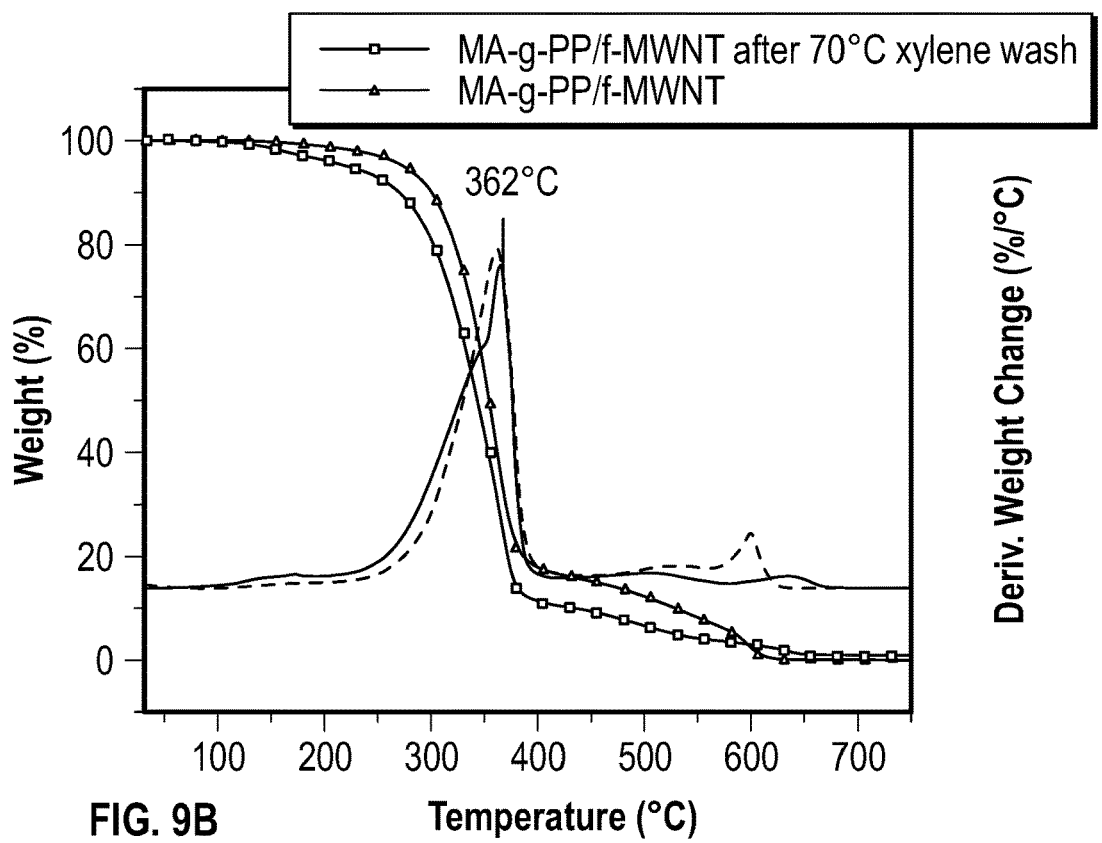
Figure 10A:
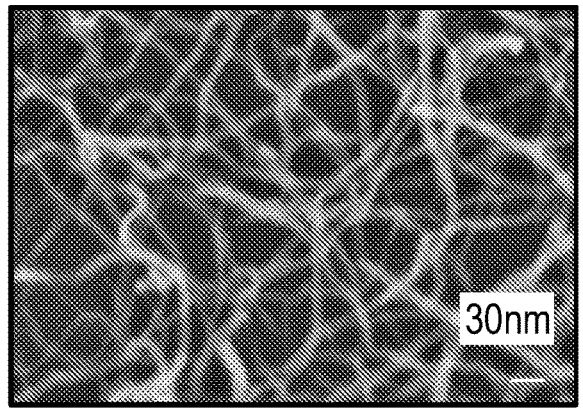
FIGS. 10A through 10D display SEM images of (a) f-MWNT, (b) PP/f-MWNT, (c) PP/f-MWNT washed in xylene at 70° C., and (d) PP/f-MWNT washed in xylene at 120° C.
Figure 10B:
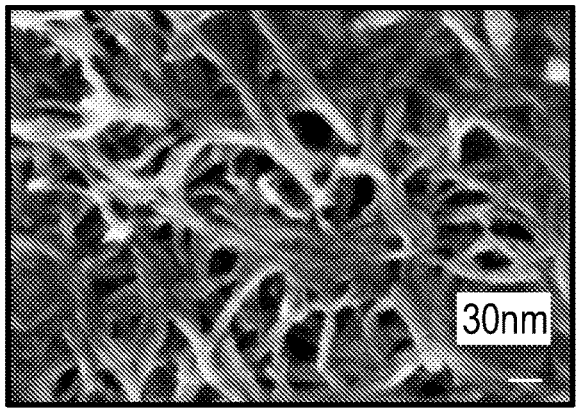
Figure 10C:
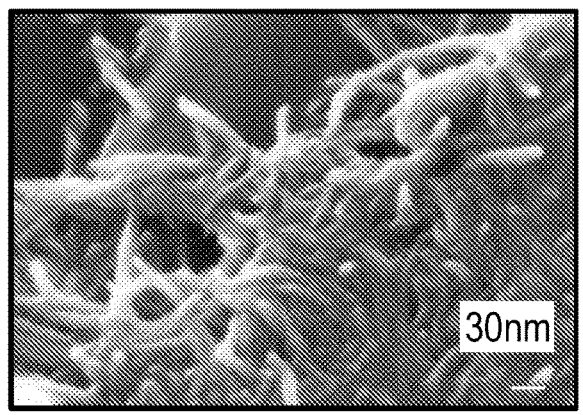
Figure 10D:
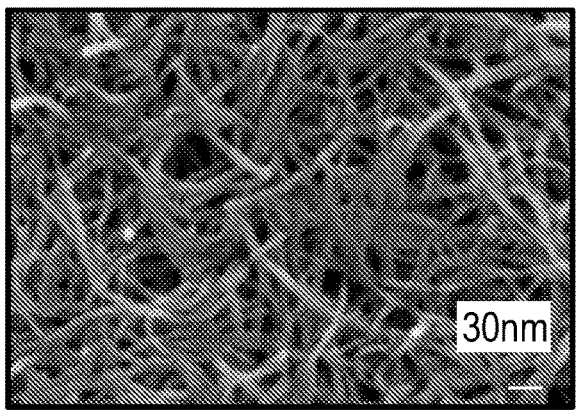

The polymer chain adsorbed onto the f-MWNT sidewalls also displayed enhanced chemical stability. While PP is fully soluble in xylene above 70° C., the PP/f-MWNT master batch had lower solubility than the control PP under the same treatment conditions. After washing at 70° C. in xylene for two hours, dissolved polymer in the master batch was filtered. The remaining weight of the master batch was about 69% of the original weight, suggesting that 31% polymer dissolved. From scanning electron micrographs, it was determined that the average f-MWNT diameter of PP/f-MWNT after 70° C. xylene washing and filtering, decreased from 23 nm to 20 nm (Table 3). The remaining sample, after washing in xylene at 70° C. showed further increase in $T_d$ from 348° C. (before xylene treatment) to 380° C. (FIGS. 9A and 9B). FIGS. 9A and 9B display TGA under $N_2$ of (a) PP/f-MWNT, and (b) MA-g-PP/f-MWNT master batches before and after xylene wash at 70° C. for two hours. Similarly, for MA-g-PP/f-MWNT master batch, about 57% residual weight was observed after 70° C. xylene washing for two hours. After treatment in xylene, the peak degradation temperature did not change significantly (FIGS. 9A and 9B). When the xylene washing temperature was increased to 120° C., almost all PP in the PP/f-MWNT was washed away, and the average f-MWNT diameter decreased close to the value of the uncoated f-MWNT (Table 3).

FIGS. 10A through 10D display SEM images of (a) f-MWNT, (b) PP/f-MWNT master batch, (c) PP/f-MWNT master batch washed in xylene at 70° C., and (d) PP/f-MWNT master batch washed in xylene at 120° C. The data in FIGS. 10A through 10D show that the polymer chains adsorbed on MWNT are not easily washed away. The data in FIGS. 10A through 10D further supports the idea of good interaction between the polymer and f-MWNT. Scale bar in FIGS. 10A through 10D represents 30 nm.

As compared to the control PP and MA-g-PP, the thermal degradation temperature of the two master batches was about 20° C. higher (under nitrogen atmosphere). After washing the PP/f-MWNT master batch in xylene at 70° C., thermal degradation temperature of the remaining PP in this xylene washed sample was 50° C. higher than that of the control PP. The two master batches also exhibited better solvent resistance than the respective control polymers. These observations provide further evidence of interaction (e.g., non-covalent interaction) between the interfacial polymers and the f-MWNT.

Example 4

The polymer coating interaction with the MWNT was investigated for both PP/f-MWNT and MA-g-PP/f-MWNT, which were prepared as described in Example 2. Evidence of CH-π interaction between PP and f-MWNT, MA-g-PP and MWNT, as well as hydrogen bonding between MA-g-PP and f-MWNT was obtained via FTIR spectroscopy.

Figure 11:
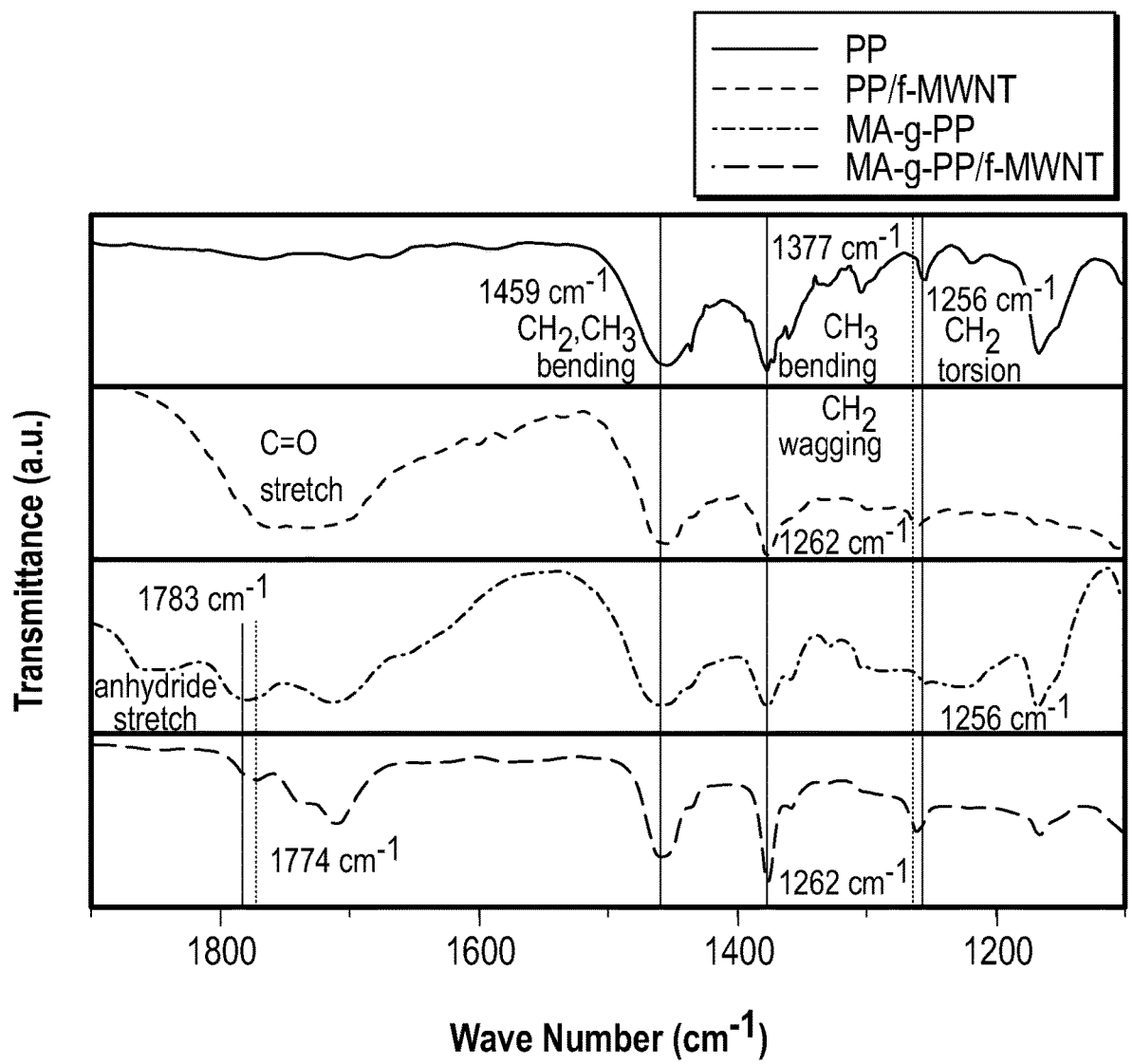
FIG. 11 displays FTIR spectra of PP, PP/f-MWNT, MA-g-PP, and MA-g-PP/f-MWNT.
Figure 12:
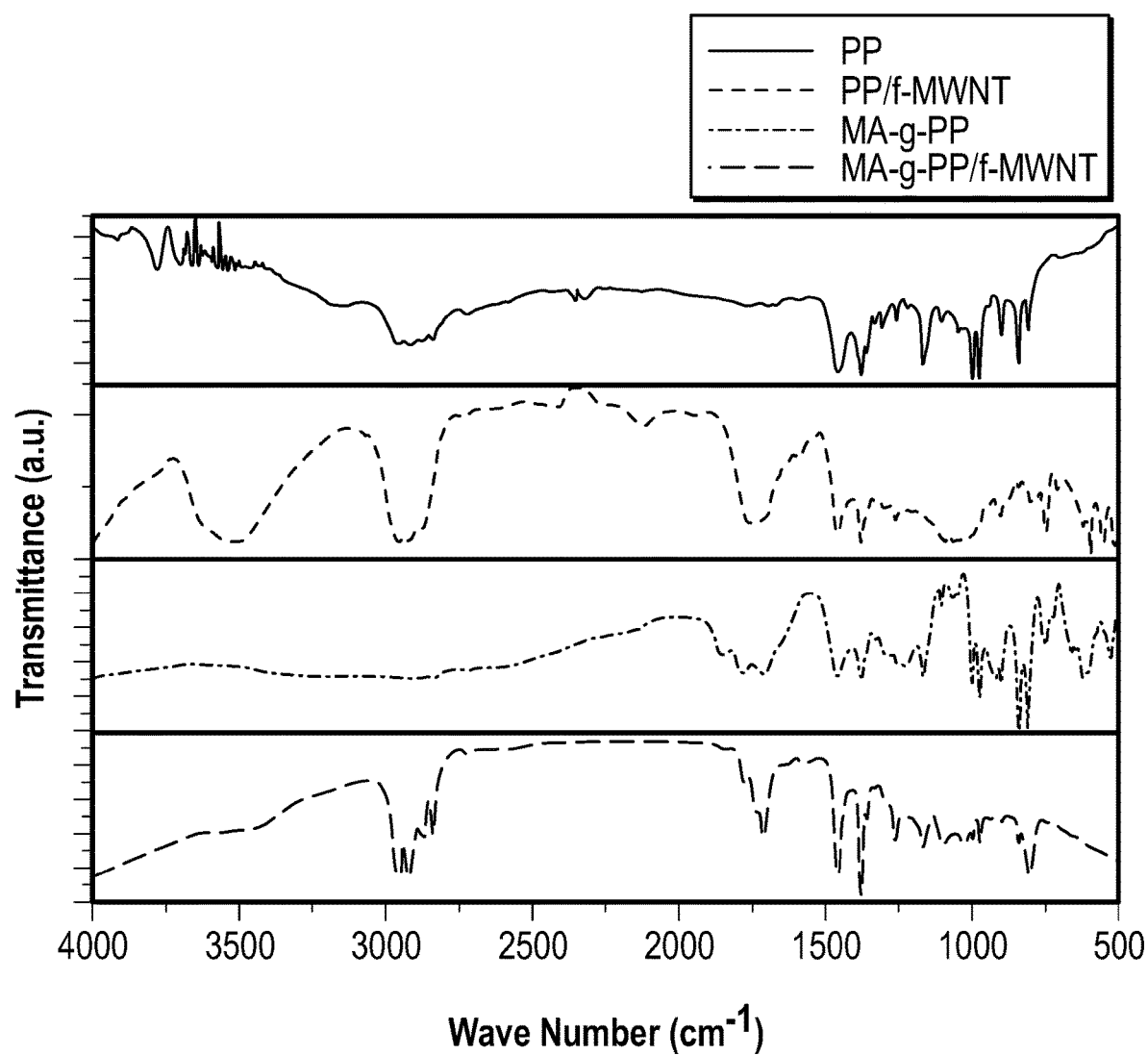
FIG. 12 displays FTIR spectra of PP, PP/f-MWNT, MA-g-PP, and MA-g-PP/f-MWNT, for the entire recorded wavenumber range.

Presence of CH-π interactions can be identified through peak shifts in FTIR. Examples of these include shifts corresponding to CH stretching (3266 cm$^{-1}$ in acetylene) or CH bending (1450 cm$^{-1}$ in polybutadiene) vibration. FIG. 11 shows FTIR spectra of PP/f-MWNT and MA-g-PP/MWNT master batches and FTIR spectra of the two control polymers (PP and MA-g-PP). While there is no change in resonance frequency of the $CH_2$, $CH_3$ asymmetry bending vibration (1460 cm$^{-1}$, 1458 cm$^{-1}$), and $CH_2$ wagging/$CH_3$ symmetry bending (1377 cm$^{-1}$) vibration when either PP or MA-g-PP interact with the f-MWNT, a slight upshift (from 1256 to 1262 cm$^{-1}$) in the $CH_2$ torsion motion was observed in both cases (FIG. 11). This upshift indicates the presence of intermolecular CH-π interaction between f-MWNT and PP, as well as between f-MWNT and MA-g-PP. In addition, in MA-g-PP/f-MWNT, hydrogen bonding between anhydride group in MA-g-PP and carbonyl groups in f-MWNT was also observed through down shift in anhydride stretch from 1783 to 1774 cm$^{-1}$ (FIG. 11). The CH-π interaction is relatively weak and is comparable to van der Waals forces, and it is about one-tenth the strength of the hydrogen bond. Without wishing to be limited by theory, it can be concluded that MA-g-PP interacts more strongly (via the formation of hydrogen as well as CH-π interaction) with f-MWNT than PP, which only displays CH-π interactions with f-MWNT. A thicker MA-g-PP coating was observed on f-MWNT than for PP, further demonstrating the difference of interaction between the two different polymers (PP and MA-g-PP) with f-MWNT (Table 2). FIG. 12 displays FTIR spectra in the entire wave number range for PP, PP/f-MWNT master batch, MA-g-PP, and MA-g-PP/f-MWNT master batch.

Figure 13:
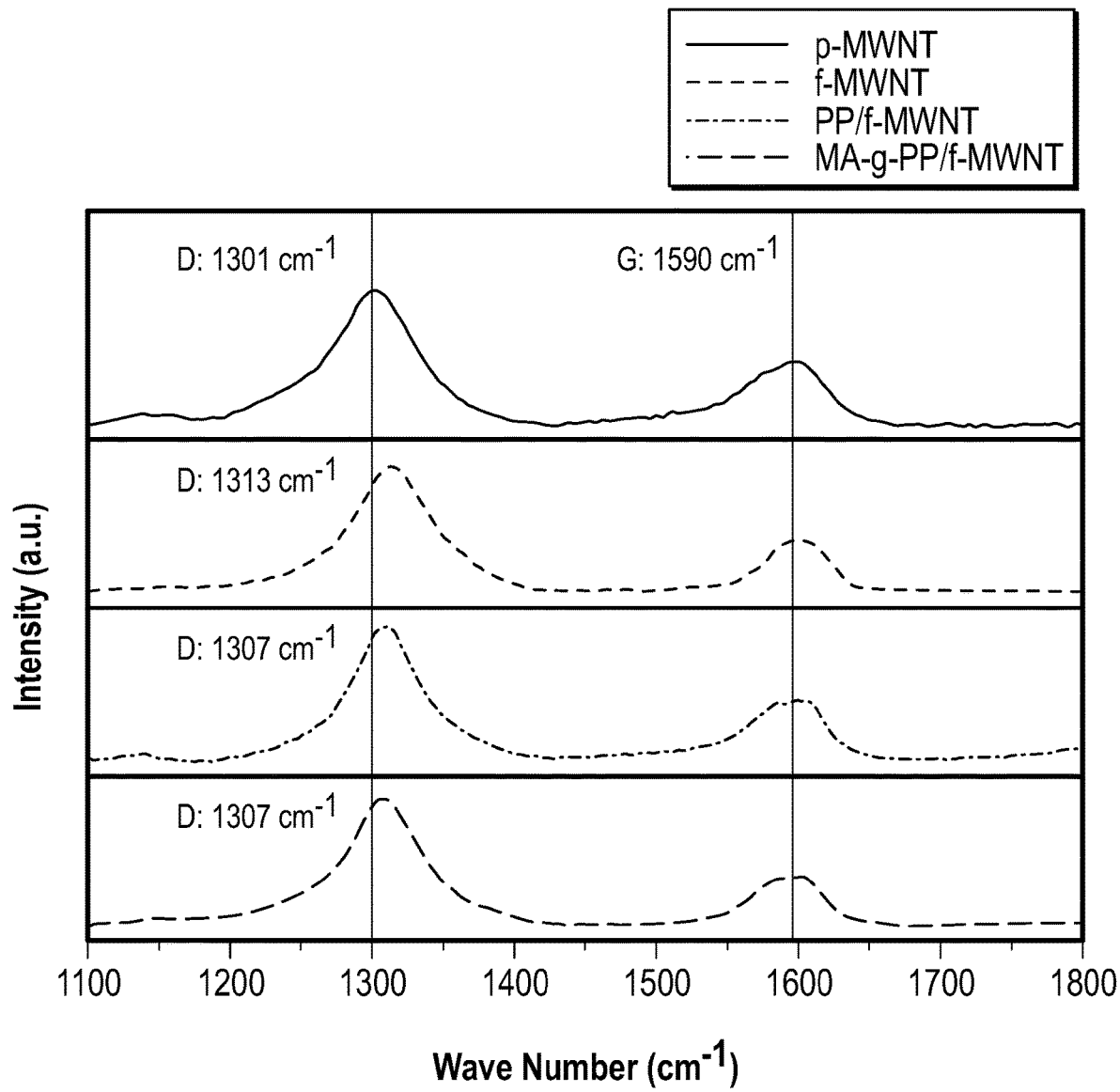
FIG. 13 displays Raman spectra of p-MWNT, f-MWNT, PP/f-MWNT, and MA-g-PP/f-MWNT.
Figure 14A:
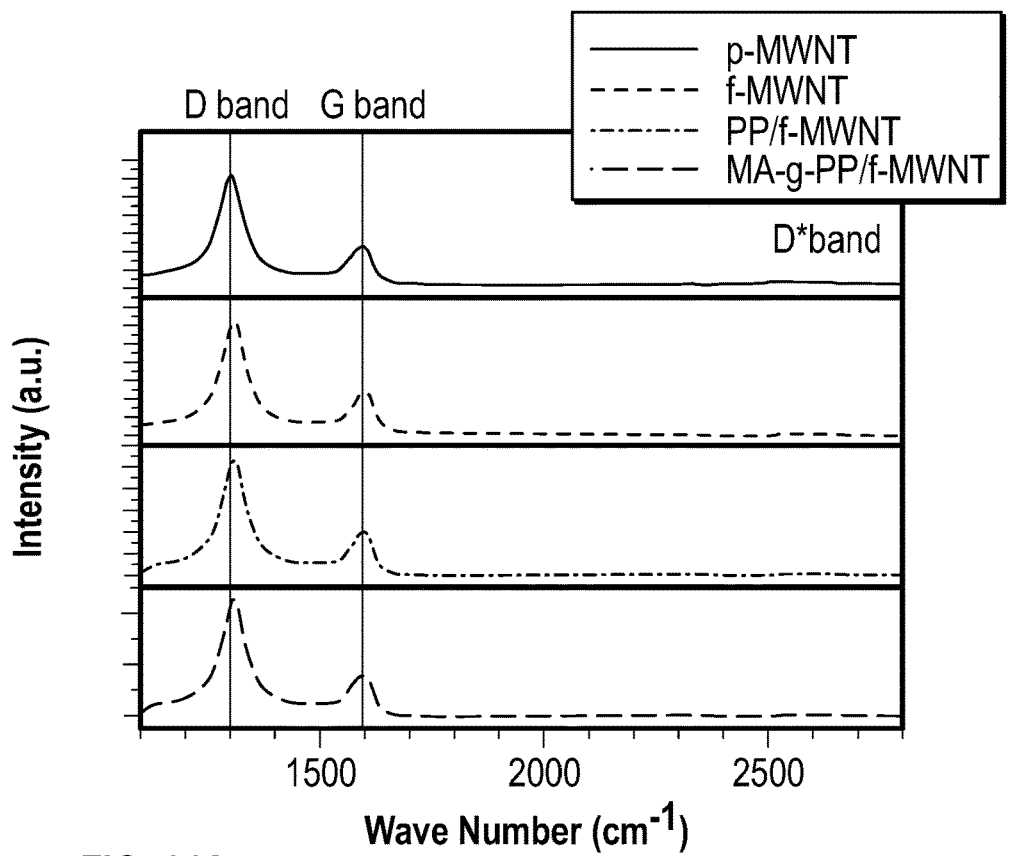
FIGS. 14A and 14B display Raman spectra of p-MWNT, f-MWNT, PP/f-MWNT, and MA-g-PP/f-MWNT.
Figure 14B:
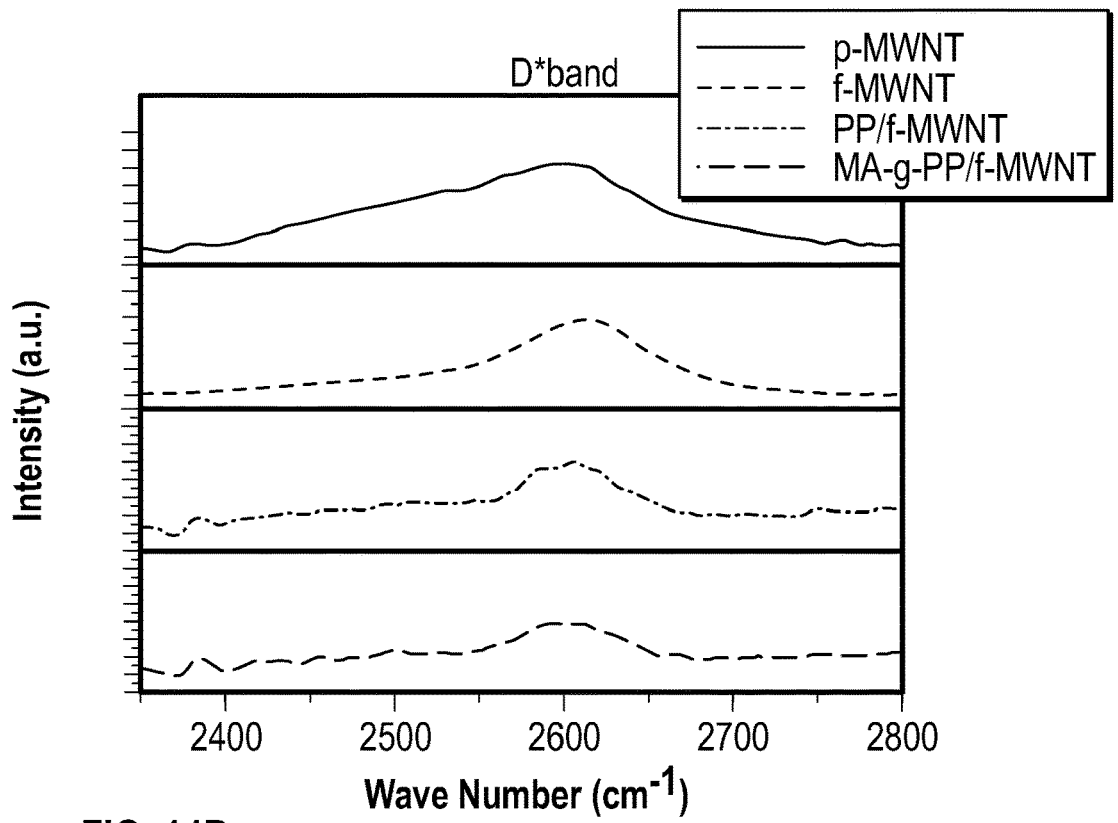

FIG. 13 shows the Raman spectra of p-MWNT, f-MWNT, PP/f-MWNT and MA-g-PP/f-MWNT where a more pronounced peak shift is observed in D band rather than G and D* bands (FIGS. 14A and 14B). Without wishing to be limited by theory, after functionalization, the upshift of D band from 1301 to 1313 cm$^{-1}$ can be related to the direct electron charge transfer from the nanotube to acceptor carbonyl groups. When f-MWNT are encapsulated by the polymer sheath, strain can be developed within the graphitic lattice that can affect the vibration motion of C—C bond due to the CH-π interactions or hydrogen bonds. Further, without wishing to be limited by theory, a downshift of D band from 1313 to 1307 cm$^{-1}$ in both PP/f-MWNT and MA-g-PP/f-MWNT master batches suggests a strain induced in the f-MWNT (FIG. 13). Similarly, downshift of both D and G bands in CNT have been previously reported due to the stretching and weakening of carbon-carbon (C—C) bond in CNT during tensile deformation or uniaxial bending. Interestingly, although MA-g-PP interacts more strongly with f-MWNT through hydrogen bonds and CH-π interaction compared with PP where only CH-π interaction exists, the D band resonance frequency exhibits the same shift of 6 cm$^{-1}$ in f-MWNT coated with either PP or MA-g-PP.

Example 5

The dispersion of the f-MWNT in the polymer coated f-MWNT was investigated for both PP/f-MWNT and MA-g-PP/f-MWNT, which were prepared as described in Example 2.

Figure 15A:
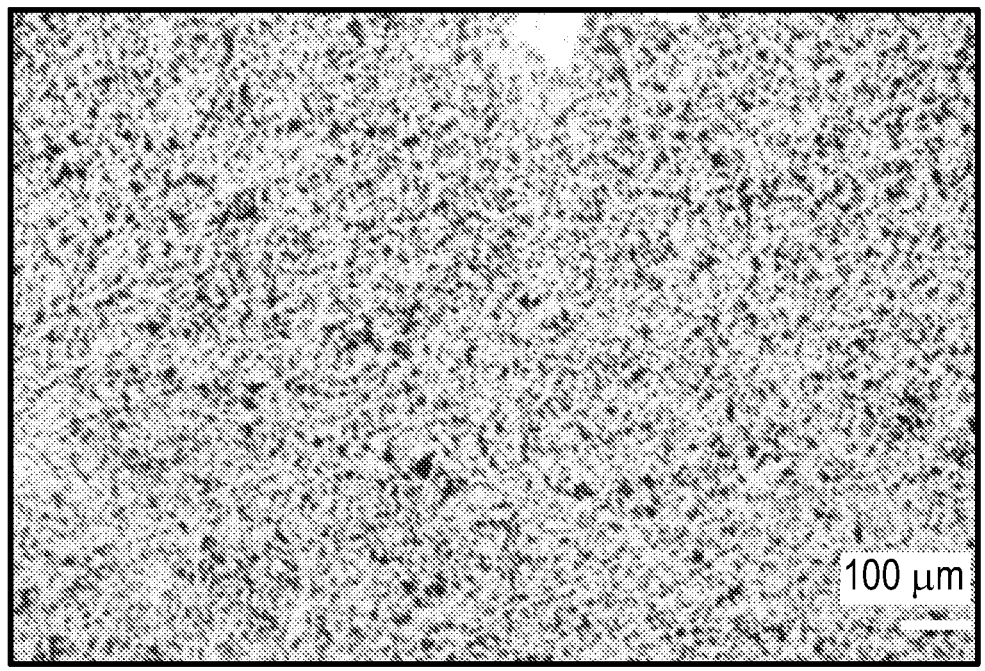
FIGS. 15A and 15B display optical micrographs of PP/f-MWNT and MA-g-PP/f-MWNT.
Figure 15B:
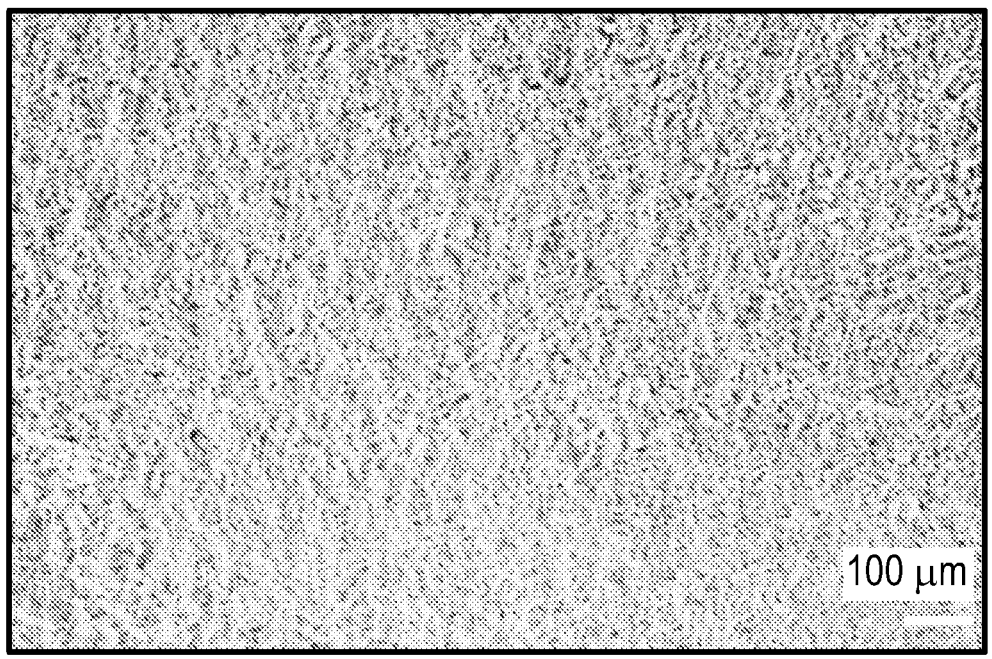

The f-MWNT dispersion in both PP and MA-g-PP based master batches was investigated under molten state using optical microscopy (FIGS. 15A and 15B). FIGS. 15A and 15B display optical micrographs of (a) PP/f-MWNT, and (b) MA-g-PP/f-MWNT master batches, wherein the scale bar represents 100 μm. As compared to PP/f-MWNT master batch, MA-g-PP/f-MWNT master batch exhibits greater homogeneity (FIGS. 15A and B) in terms of f-MWNT dispersion in the polymer matrix. Dark regions in PP/f-MWNT master batch in FIG. 15A are regions with high f-MWNT concentration.

Example 6

The melting and crystallization behavior of the f-MWNT in the polymer coated f-MWNT was investigated for both PP/f-MWNT and MA-g-PP/f-MWNT, which were prepared as described in Example 2.

Table 4 displays differential scanning calorimetry (DSC) melting and crystallization data of the PP/f-MWNT and MA-g-PP/f-MWNT master batches along with the respective control samples, for 10° C./min ramping rate.

TABLE 4

| Sample | $T_o^1$ (° C.) | $T_c$ (° C.) | FWHM of $T_c$ peak | $T_m$ (° C.) | Crystallinity (%) |
|---|---|---|---|---|---|
| MA-g-PP | 119.2 | 115.5 | 5.4 | 147/155 | —² |
| MA-g-PP/f-MWNT master batch | 120.5 | 117.5 | 4.9 | 146/154 | —² |
| PP | 123.6 | 119.0 | 5.7 | 160 | 51 |
| PP/f-MWNT master batch | 125.0 | 123.0 | 3.4 | 162 | 48 |

Notes:
¹onset of crystallization temperature ($T_o$), Crystallization temperature ($T_c$), and melting temperature ($T_m$);
²Enthalpy of melting for 100% crystalline MA-g-PP was not available.

Figure 16:
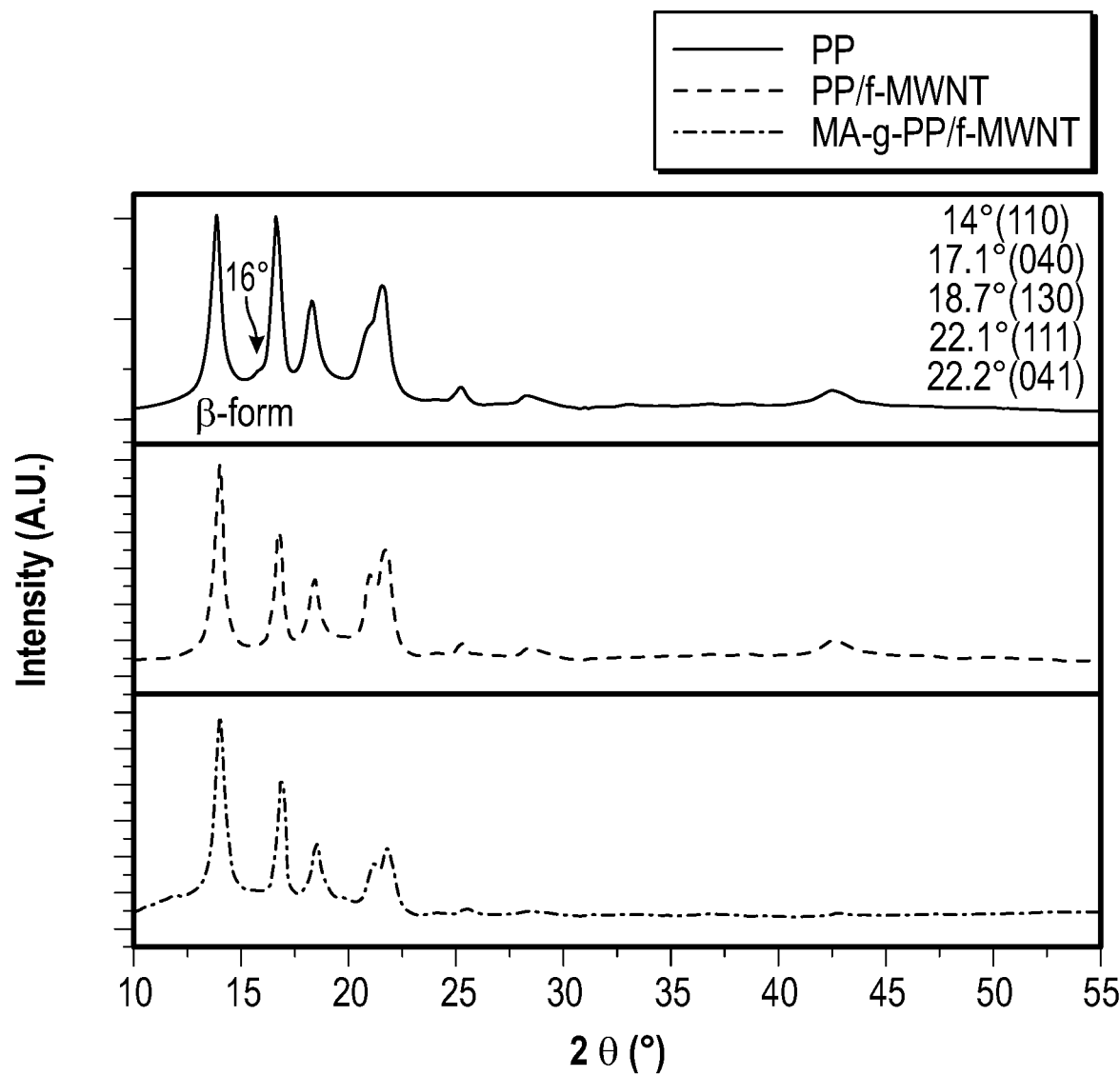
FIG. 16 displays WAXD curves for PP, PP/f-MWNT, and MA-g-PP/f-MWNT.
Figure 17A:
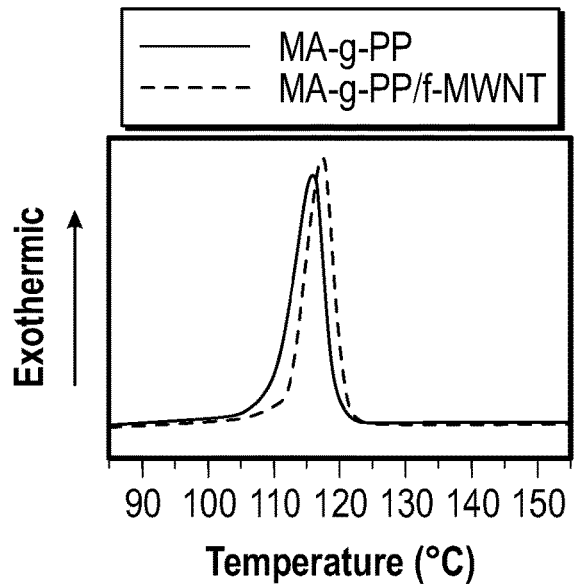
FIGS. 17A through 17D display DSC plots of PP, PP/f-MWNT, MA-g-PP, and MA-g-PP/f-MWNT.
Figure 17B:
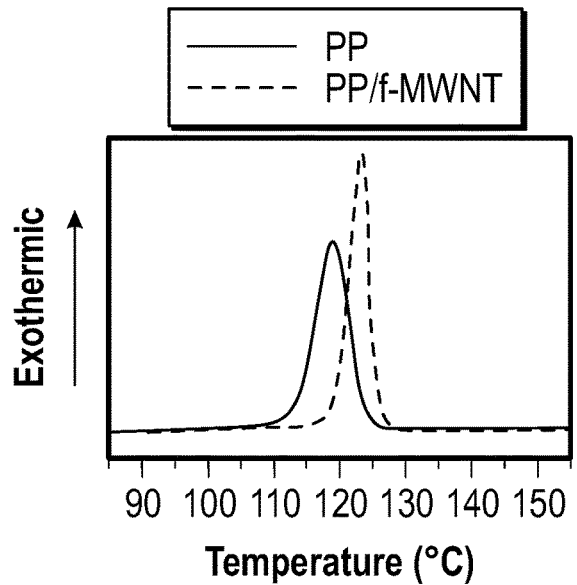

To ensure comparable control samples for the DSC experiments, PP and MA-g-PP samples were dissolved in xylene and then xylene was evaporated by vacuum drying. The vacuum dried polymer samples were grounded using mortar and pestle. WAXD shows only α-form crystal in both PP/f-MWNT and MA-g-PP/f-MWNT master batches (FIG. 16). Addition of f-MWNT resulted in increased crystallization temperature ($T_c$) and decreased FWHM of the crystallization peak as compared to that of the unfilled polymer in both PP and MA-g-PP systems. Increased crystallization temperature suggests enhanced nucleation rate while a decreased FWHM of the crystallization peak suggests narrower crystal size distribution. The effect is more evident in PP/f-MWNT where a 4° C. increase of $T_c$ was observed as compared to a 2° C. increase in MA-g-PP/f-MWNT, when compared to their respective control samples (FIGS. 17A and B, Table 4).

Figure 17C:
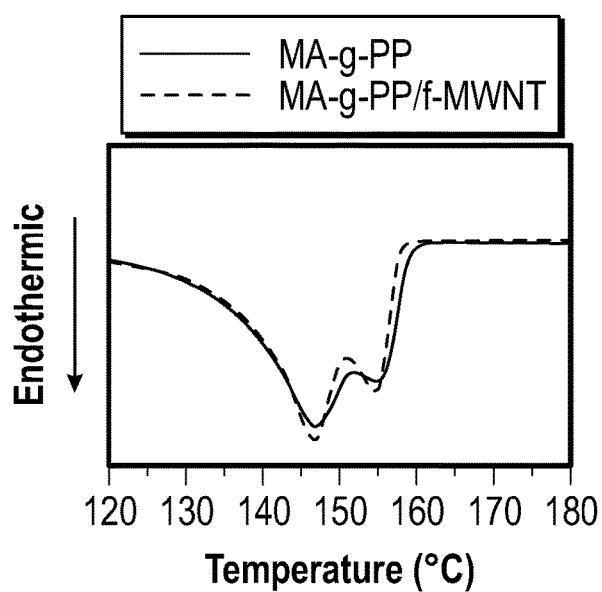
Figure 17D:
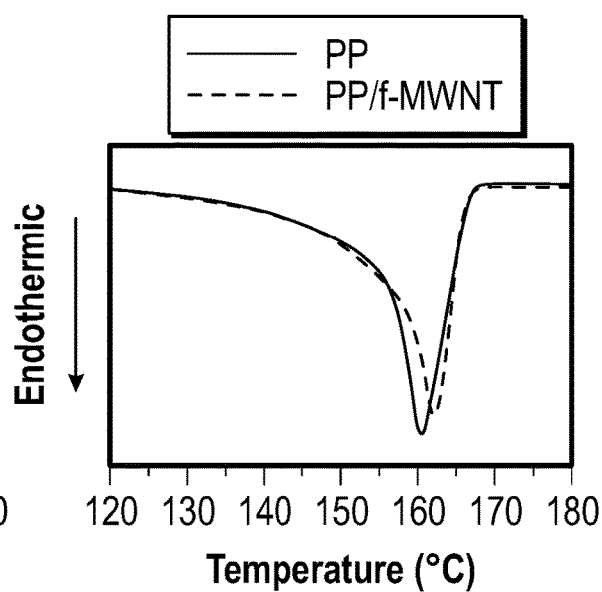

In the case of PP master batch, $T_m$ shifted from 160 to 162° C. (Table 4), suggesting higher crystal perfection and/or larger crystals in PP/f-MWNT containing nanocomposite than in the control. Double melting endotherm peak is observed in the MA-g-PP based samples (FIG. 17C). Smaller and imperfect crystals melt at lower temperature, and then recrystallize into more perfect and/or larger crystals upon further heating. These more perfect or larger crystals melt at higher temperature and contribute to the double melting peaks in the DSC curve (FIG. 17C).

A more pronounced enhancement of both the crystallization ($T_c$) and melting ($T_m$) temperatures as compared to the respective control samples was observed in the PP/f-MWNT master batch, as compared to the $T_c$ and $T_m$ enhancement for the MA-g-PP/f-MWNT master batch, although f-MWNT dispersion was better in the latter case.

For the purpose of any U.S. national stage filing from this application, all publications and patents mentioned in this disclosure are incorporated herein by reference in their entireties, for the purpose of describing and disclosing the constructs and methodologies described in those publications, which might be used in connection with the methods of this disclosure. Any publications and patents discussed herein are provided solely for their disclosure prior to the filing date of the present application. Nothing herein is to be construed as an admission that the inventors are not entitled to antedate such disclosure by virtue of prior invention.

In any application before the United States Patent and Trademark Office, the Abstract of this application is provided for the purpose of satisfying the requirements of 37 C.F.R. § 1.72 and the purpose stated in 37 C.F.R. § 1.72(b) "to enable the United States Patent and Trademark Office and the public generally to determine quickly from a cursory inspection the nature and gist of the technical disclosure." Therefore, the Abstract of this application is not intended to be used to construe the scope of the claims or to limit the scope of the subject matter that is disclosed herein. Moreover, any headings that can be employed herein are also not intended to be used to construe the scope of the claims or to limit the scope of the subject matter that is disclosed herein. Any use of the past tense to describe an example otherwise indicated as constructive or prophetic is not intended to reflect that the constructive or prophetic example has actually been carried out.

The present disclosure is further illustrated by the following examples, which are not to be construed in any way as imposing limitations upon the scope thereof. On the contrary, it is to be clearly understood that resort can be had to various other aspects, embodiments, modifications, and equivalents thereof which, after reading the description herein, can be suggest to one of ordinary skill in the art without departing from the spirit of the present invention or the scope of the appended claims.

ADDITIONAL DISCLOSURE

A first embodiment, which is a method of making polypropylene-coated functionalized multiwall carbon nanotubes (PP/f-MWNT), the method comprising (a) contacting pristine multiwall carbon nanotubes (p-MWNT) with nitric acid to produce functionalized multiwall carbon nanotubes (f-MWNT); (b) contacting at least a portion of the f-MWNT with a first solvent to form a f-MWNT dispersion; (c) contacting polypropylene (PP) with a second solvent to form a PP solution; (d) contacting at least a portion of the f-MWNT dispersion with at least a portion of the PP solution to form a PP and f-MWNT suspension; and (e) drying at least a portion of the PP and f-MWNT suspension to form the PP/f-MWNT.

A second embodiment, which is the method of the first embodiment, wherein the step (a) of contacting p-MWNT with nitric acid comprises (i) contacting at least a portion of the p-MWNT with water and nitric acid to form a p-MWNT acidic suspension; and (ii) dispersing at least a portion of the p-MWNT acidic suspension to form a p-MWNT acidic dispersion.

A third embodiment, which is the method of the second embodiment, wherein dispersing the p-MWNT acidic suspension comprises agitating, stirring, magnetic stirring, sonicating, or combinations thereof.

A fourth embodiment, which is the method of any one of the first through the third embodiments further comprising (iii) refluxing at least a portion of the p-MWNT acidic dispersion at a temperature of from about 100° C. to about 140° C., and for a time period of from about 12 hours to about 48 hours, to produce the f-MWNT.

A fifth embodiment, which is the method of any one of the first through the fourth embodiments, wherein the step (b) of contacting at least a portion of the f-MWNT with a first solvent comprises (i) washing at least a portion of the f-MWNT with water to produce water washed f-MWNT; (ii) washing at least a portion of the water washed f-MWNT with the first solvent to produce first solvent washed f-MWNT; and (iii) contacting at least a portion of the first solvent washed f-MWNT with the first solvent to form a f-MWNT suspension.

A sixth embodiment, which is the method of the fifth embodiment, wherein the step (b) of contacting at least a portion of the f-MWNT with a first solvent further comprises (iv) dispersing at least a portion of the f-MWNT suspension to form the f-MWNT dispersion.

A seventh embodiment, which is the method of the sixth embodiment, wherein dispersing the f-MWNT suspension comprises sonicating the f-MWNT suspension for a time period of from about 24 hours to about 72 hours to form the f-MWNT dispersion, wherein the f-MWNT dispersion is stable for a time period of from about 1 month to about 1 year.

An eighth embodiment, which is the method of any one of the first through the seventh embodiments, wherein the first solvent comprises a polar solvent, an alcohol, methanol, ethanol, propanol, isopropanol, butanol, pentanol, a mild acid, acetic acid, lactic acid, oxalic acid, formic acid, succinic acid, acetone, or combinations thereof.

A ninth embodiment, which is the method of any one of the first through the eighth embodiments, wherein the f-MWNT dispersion has a concentration of f-MWNT in the first solvent of from about 5 mg/liter to about 100 mg/liter, based on the volume of the first solvent.

A tenth embodiment, which is the method of any one of the first through the ninth embodiments, wherein the step (c) of contacting PP with a second solvent comprises heating the PP in the second solvent under agitating, stirring, magnetic stirring, or combinations thereof.

An eleventh embodiment, which is the method of the tenth embodiment, wherein the second solvent is heated to a temperature effective to allow for substantially complete dissolution of PP in the second solvent.

A twelfth embodiment, which is the method of any one of the first through the eleventh embodiments, wherein the second solvent is heated to a temperature in a range of from about 80° C. to about 130° C.

A thirteenth embodiment, which is the method of any one of the first through the twelfth embodiments, wherein the PP solution has a concentration of PP in the second solvent of from about 0.5 g/liter to about 5 g/liter, based on the volume of the second solvent.

A fourteenth embodiment, which is the method of any one of the first through the thirteenth embodiments, wherein the second solvent comprises an aromatic hydrocarbon solvent, xylene, o-xylene, m-xylene, p-xylene, ethylbenzene, toluene, tetralin, chlorobenzene, cycloalkanes, cyclohexane, decalin, or combinations thereof.

A fifteenth embodiment, which is the method of any one of the first through the fourteenth embodiments, wherein the step (d) of contacting the f-MWNT dispersion with the PP solution comprises (i) heating the f-MWNT dispersion to a first temperature; (ii) adding the PP solution to the f-MWNT dispersion to form the PP and f-MWNT suspension, wherein the PP solution is characterized by a second temperature, and wherein the first temperature is lower than the second temperature.

A sixteenth embodiment, which is the method of the fifteenth embodiment, wherein the PP solution is added to the f-MWNT dispersion at a flow rate of from about 20 mL/minute to about 40 mL/minute under agitating, stirring, magnetic stirring, or combinations thereof.

A seventeenth embodiment, which is the method of any one of the first through the sixteenth embodiments, wherein the PP and f-MWNT suspension has a volumetric ratio of the second solvent to the first solvent of from about 1:1 to about 1:5, and a weight ratio of f-MWNT to PP of from about 0.5:99.5 to about 80:20.

An eighteenth embodiment, which is the method of any one of the first through the seventeenth embodiments, wherein the step (e) of drying the PP and f-MWNT suspension occurs under agitating, stirring, magnetic stirring, or combinations thereof; at a temperature of from about from about 40° C. to about 80° C.; and at a pressure of from about 50 mbar to about 1,013 mbar.

A nineteenth embodiment, which is the method of any one of the first through the eighteenth embodiments further comprising subjecting the PP/f-MWNT to grinding, crushing, milling, chopping, or combinations thereof, to form a PP/f-MWNT powder, wherein the PP/f-MWNT powder is characterized by an average powder particle size of from about 10 μm to about 1 mm.

A twentieth embodiment, which is polypropylene-coated functionalized multiwall carbon nanotubes (PP/f-MWNT) produced by a process comprising (a) contacting pristine multiwall carbon nanotubes (p-MWNT) with nitric acid to produce functionalized multiwall carbon nanotubes (f-MWNT); (b) contacting at least a portion of the f-MWNT with a first solvent to form a f-MWNT dispersion; (c) contacting polypropylene (PP) with a second solvent to form a PP solution; (d) contacting at least a portion of the f-MWNT dispersion with at least a portion of the PP solution to form a PP and f-MWNT suspension; and (e) drying at least a portion of the PP and f-MWNT suspension to form the PP/f-MWNT.

A twenty-first embodiment, which is polypropylene-coated functionalized multiwall carbon nanotubes (PP/f-MWNT) comprising functionalized multiwall carbon nanotubes (f-MWNT) in an amount of from about 0.5 wt. % to about 80 wt. %, based on the total weight of the PP/f-MWNT; and polypropylene (PP) in an amount of from about 20 wt. % to about 99.5 wt. %, based on the total weight of the PP/f-MWNT.

A twenty-second embodiment, which is the PP/f-MWNT of the twenty-first embodiment, wherein the PP coats the f-MWNT via non-covalent interactions.

A twenty-third embodiment, which is the PP/f-MWNT of the twenty-second embodiment, wherein the non-covalent interactions exclude hydrogen bonding.

A twenty-fourth embodiment, which is the PP/f-MWNT of any one of the twenty-first through the twenty-third embodiments, wherein the non-covalent interactions comprise intermolecular CH-π interactions.

A twenty-fifth embodiment, which is the PP/f-MWNT of the twenty-fourth embodiment, wherein the intermolecular CH-π interactions are characterized by an upshift in $CH_2$ torsion motion, when compared to the $CH_2$ torsion motion of the same PP used for coating the f-MWNT but in the absence of the f-MWNT; and wherein the upshift is an increase in the wavenumber of from about 4 $cm^{-1}$ to about 10 $cm^{-1}$, as determined by Fourier transform infrared spectroscopy (FTIR).

A twenty-sixth embodiment, which is the PP/f-MWNT of any one of the twenty-first through the twenty-fifth embodiments, wherein the intermolecular CH-π interactions are characterized by a downshift of D band, when compared to the D band of the same f-MWNT that have not been coated with PP; and wherein the downshift is a decrease in the wavenumber of from about 4 $cm^{-1}$ to about 10 $cm^{-1}$, as determined by Raman spectroscopy.

A twenty-seventh embodiment, which is the PP/f-MWNT of any one of the twenty-first through the twenty-sixth embodiments, wherein the f-MWNT have a diameter of from about 5 nm to about 200 nm; a length of from about 0.5 microns to about 1 mm; and from about 3 walls to about 100 walls.

A twenty-eighth embodiment, which is the PP/f-MWNT of any one of the twenty-first through the twenty-seventh embodiments, wherein the f-MWNT are characterized by a ratio of intensity of D band to intensity of G band ($I_D/I_G$) that is increased by equal to or greater than about 20%, when compared to an $I_D/I_G$ for pristine multiwall carbon nanotubes (p-MWNT) that have not been treated with nitric acid, as determined by Raman spectroscopy; and wherein the f-MWNT comprise more carboxylic acid groups (—COOH) than the p-MWNT.

A twenty-ninth embodiment, which is the PP/f-MWNT of any one of the twenty-first through the twenty-eighth embodiments, wherein the PP is characterized by an isotacticity of from about 90% to 100%, as measured by $^{13}C$ nuclear magnetic resonance ($^{13}C$ NMR) spectroscopy.

A thirtieth embodiment, which is the PP/f-MWNT of any one of the twenty-first through the twenty-ninth embodiments, wherein the PP is characterized by a melt flow index (MFI) of from about 0.1 dg/min to about 250 dg/min, as determined in accordance with ISO 1133 under a load of 2.16 kg; and by a molecular weight distribution of from about 1 to about 10, as determined in accordance with size exclusion chromatography/differential viscometry (SEC/DV).

A thirty-first embodiment, which is the PP/f-MWNT of any one of the twenty-first through the thirtieth embodiments, wherein the PP/f-MWNT have a PP coating thickness of from about 1 nm to about 10 nm.

A thirty-second embodiment, which is the PP/f-MWNT of the thirty-first embodiment, wherein the PP coating is characterized by a solubility in aromatic hydrocarbon solvents at 70° C. that is decreased by equal to or greater than about 25%, when compared to a solubility in aromatic hydrocarbon solvents at 70° C. of the same PP used for coating the f-MWNT but in the absence of the f-MWNT.

A thirty-third embodiment, which is the PP/f-MWNT of any one of the twenty-first through the thirty-second embodiments, wherein the PP of the PP/f-MWNT is characterized by a thermal decomposition temperature that is increased by equal to or greater than about 10° C. when compared to a thermal decomposition temperature of the same PP used for coating the f-MWNT but in the absence of the f-MWNT, as determined by thermogravimetric analysis (TGA) under a nitrogen atmosphere.

A thirty-fourth embodiment, which is the PP/f-MWNT of any one of the twenty-first through the thirty-third embodiments, wherein the PP of the PP/f-MWNT is characterized by a crystallization temperature that is increased by equal to or greater than about 2° C. when compared to a crystallization temperature of the same PP used for coating the f-MWNT but in the absence of the f-MWNT, as determined by differential scanning calorimetry (DSC) thermal analysis in accordance with ASTM E794-06.

A thirty-fifth embodiment, which is the PP/f-MWNT of any one of the twenty-first through the thirty-fourth embodiments, wherein the PP of the PP/f-MWNT is characterized by a melting temperature that is increased by equal to or greater than about 1° C. when compared to a melting temperature of the same PP used for coating the f-MWNT but in the absence of the f-MWNT, as determined by differential scanning calorimetry (DSC) thermal analysis in accordance with ASTM E794-06.

A thirty-sixth embodiment, which is the PP/f-MWNT of any one of the twenty-first through the thirty-fifth embodiments, wherein the PP/f-MWNT comprise equal to or greater than about 50 wt. % discrete f-MWNT coated with PP (discrete PP/f-MWNT), based on the total weight of the f-MWNT.

A thirty-seventh embodiment, which is the PP/f-MWNT of the thirty-sixth embodiment, wherein the discrete PP/f-MWNT have a diameter of from about 6 nm to about 210 nm.

A thirty-eighth embodiment, which is polypropylene-coated functionalized multiwall carbon nanotubes (PP/f-MWNT) comprising functionalized multiwall carbon nanotubes (f-MWNT) and polypropylene (PP), wherein the PP coats the f-MWNT via non-covalent interactions.

A thirty-ninth embodiment, which is the PP/f-MWNT of the thirty-eighth embodiment, wherein the non-covalent interactions comprise intermolecular CH-π interactions, and wherein the non-covalent interactions exclude hydrogen bonding.

A fortieth embodiment, which is polypropylene-coated functionalized multiwall carbon nanotubes (PP/f-MWNT) comprising functionalized multiwall carbon nanotubes (f-MWNT) in an amount of from about 0.5 wt. % to about 10 wt. %, based on the total weight of the PP/f-MWNT, and polypropylene (PP) in an amount of from about 90 wt. % to about 99.5 wt. %, based on the total weight of the PP/f-MWNT; wherein the PP coats the f-MWNT via non-covalent interactions; wherein the PP is characterized by an isotacticity of from about 90% to 100%; wherein the f-MWNT have a diameter of from about 5 nm to about 20 nm, a length of from about 0.5 microns to about 20 microns, and from about 5 walls to about 15 walls; and wherein a PP coating has thickness of from about 1 nm to about 10 nm.

While embodiments of the disclosure have been shown and described, modifications thereof can be made without departing from the spirit and teachings of the invention. The embodiments and examples described herein are exemplary only, and are not intended to be limiting. Many variations and modifications of the invention disclosed herein are possible and are within the scope of the invention.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the detailed description of the present invention. The disclosures of all patents, patent applications, and publications cited herein are hereby incorporated by reference.

What is claimed is:

1. A method of making polypropylene-coated functionalized multiwall carbon nanotubes (PP/f-MWNT), the method comprising:
   (a) contacting pristine multiwall carbon nanotubes (p-MWNT) with nitric acid to produce functionalized multiwall carbon nanotubes (f-MWNT) comprising carboxylic acid groups;
   (b) contacting at least a portion of the f-MWNT comprising carboxylic acid groups with a first solvent to form a f-MWNT comprising carboxylic acid groups dispersion;
   (c) contacting polypropylene (PP) with a second solvent to form a PP solution;
   (d) contacting at least a portion of the f-MWNT comprising carboxylic acid groups dispersion with at least a portion of the PP solution to form a PP and f-MWNT comprising carboxylic acid groups suspension; and
   (e) drying at least a portion of the PP and f-MWNT comprising carboxylic acid groups suspension to form polypropylene-coated functionalized multiwall carbon nanotubes (PP/f-MWNT).

2. The method of claim 1, wherein the step (a) of contacting comprises:
   (i) contacting at least a portion of the p-MWNT with water and nitric acid to form a p-MWNT acidic suspension; and
   (ii) dispersing at least a portion of the p-MWNT acidic suspension to form a p-MWNT acidic dispersion.

3. The method of claim 2, wherein the step (a) further comprises (iii) refluxing at least a portion of the p-MWNT acidic dispersion at a temperature of from about 100 C to about 140 C, and for a time period of from about 12 hours to about 48 hours, to produce the f-MWNT comprising carboxylic acid groups.

4. The method of claim 1, wherein the step (b) contacting further comprises:
   (i) washing at least a portion of the f-MWNT comprising carboxylic acid groups with water to produce water washed f-MWNT comprising carboxylic acid groups;
   (ii) washing at least a portion of the water washed f-MWNT comprising carboxylic acid groups with the first solvent to produce first solvent washed f-MWNT comprising carboxylic acid groups; and
   (iii) contacting at least a portion of the first solvent washed f-MWNT comprising carboxylic acid groups with the first solvent to form a f-MWNT comprising carboxylic acid groups suspension.

5. The method of claim 4, wherein the step (b) contacting further comprises (iv) dispersing at least a portion of the f-MWNT comprising carboxylic acid groups suspension in the first solvent to form the f-MWNT comprising carboxylic acid groups dispersion.

6. The method of claim 1, wherein the first solvent comprises a polar solvent, a mild acid, or combinations thereof, and the second solvent comprises an aromatic hydrocarbon solvent, cycloalkanes, or combinations thereof.

7. The method of claim 1, wherein:
   the f-MWNT comprising carboxylic acid groups dispersion has a concentration of f-MWNT comprising carboxylic acid groups in the first solvent of from about 5 mg/liter to about 100 mg/liter, based on the volume of the first solvent;
   the PP solution has a concentration of PP in the second solvent of from about 0.5 g/liter to about 5 g/liter, based on the volume of the second solvent; and
   the PP and f-MWNT comprising carboxylic acid groups suspension has a volumetric ratio of the second solvent to the first solvent of from about 1:1 to about 1:5, and a weight ratio of f-MWNT to PP of from about 0.5:99.5 to about 80:20.

8. The method of claim 1, wherein the step (c) contacting further comprises heating the PP in the second solvent to a temperature in a range of from about 80 C to about 130 C under agitating.

9. The method of claim 1, wherein the step (d) contacting further comprises:
   (i) heating the f-MWNT comprising carboxylic acid groups dispersion to a first temperature; and
   (ii) adding the PP solution to the f-MWNT comprising carboxylic acid groups dispersion to form the PP and f-MWNT comprising carboxylic acid groups suspension, wherein the PP solution is characterized by a second temperature, and wherein the first temperature is lower than the second temperature.

10. The method of claim 1, wherein the step (e) of drying occurs under agitating at a temperature of from about from about 40 C to about 80 C; and at a pressure of from about 50 millibar (mbar) to about 1,013 mbar.

11. A polypropylene-coated functionalized multiwall carbon nanotube (PP/f-MWNT) comprising:
   a functionalized multiwall carbon nanotubes (f-MWNT) comprising carboxylic acid groups in an amount of from about 0.5 wt. % to about 80 wt. %, based on the total weight of the a polypropylene-coated functionalized multiwall carbon nanotube (PP/f-MWNT) comprising carboxylic acid groups; and
   polypropylene (PP) in an amount of from about 20 wt. % to about 99.5 wt. %, based on the total weight of the PP/f-MWNT comprising carboxylic acid groups.

12. The PP/f-MWNT comprising carboxylic acid groups of claim 11, wherein the PP coats the f-MWNT comprising carboxylic acid groups via non-covalent interactions, and wherein the non-covalent interactions exclude hydrogen bonding.

13. The PP/f-MWNT comprising carboxylic acid groups of claim 12, wherein the non-covalent interactions comprise intermolecular CH-π interactions.

14. The PP/f-MWNT comprising carboxylic acid groups of claim 13, wherein the intermolecular CH-π interactions are characterized by an upshift in $CH_2$ torsion motion, when compared to the $CH_2$ torsion motion of the same PP used for coating the f-MWNT comprising carboxylic acid groups but in the absence of the f-MWNT comprising carboxylic acid groups; and wherein the upshift is an increase in the wavenumber of from about 4 $cm^{-1}$ to about 10 $cm^{-1}$, as determined by Fourier transform infrared spectroscopy (FTIR); and
   wherein the intermolecular CH-π interactions are characterized by a downshift of D band, when compared to the D band of the same f-MWNT comprising carboxylic acid groups that have not been coated with PP; and wherein the downshift is a decrease in the wavenumber of from about 4 cm$^{-1}$ to about 10 cm$^{-1}$, as determined by Raman spectroscopy.

15. The PP/f-MWNT comprising carboxylic acid groups of claim 11, wherein the f-MWNT comprising carboxylic acid groups have a diameter of from about 5 nm to about 200 nm, a length of from about 0.5 microns to about 1 mm, and from about 3 walls to about 100 walls.

16. The PP/f-MWNT comprising carboxylic acid groups of claim 11, wherein the f-MWNT comprising carboxylic acid groups are characterized by a ratio of intensity of D band to intensity of G band ($I_D/I_G$) that is increased by equal to or greater than about 20%, when compared to an $I_D/I_G$ for pristine multiwall carbon nanotubes (p-MWNT) that have not been treated with nitric acid, as determined by Raman spectroscopy; and wherein the f-MWNT comprising carboxylic acid groups comprise more carboxylic acid groups (—COOH) than the p-MWNT.

17. The PP/f-MWNT comprising carboxylic acid groups of claim 11, wherein the PP is characterized by:
    an isotacticity of from about 90% to 100%, as measured by $^{13}$C nuclear magnetic resonance ($^{13}$C NMR) spectroscopy;
    a melt flow index (MFI) of from about 0.1 dg/min to about 250 dg/min, as determined in accordance with ISO 1133 under a load of 2.16 kg; and
    a molecular weight distribution of from about 1 to about 10, as determined in accordance with size exclusion chromatography/differential viscometry (SEC/DV).

18. The PP/f-MWNT comprising carboxylic acid groups of claim 11, wherein the PP/f-MWNT comprising carboxylic acid groups have a PP coating thickness of from about 1 nm to about 10 nm, and wherein the PP coating is characterized by a solubility in aromatic hydrocarbon solvents at 70 C that is decreased by equal to or greater than about 25%, when compared to a solubility in aromatic hydrocarbon solvents at 70 C of the same PP used for coating the f-MWNT comprising carboxylic acid groups but in the absence of the f-MWNT comprising carboxylic acid groups.

19. The PP/f-MWNT comprising carboxylic acid groups of claim 11, wherein the PP of the PP/f-MWNT comprising carboxylic acid groups is characterized by:
    a thermal decomposition temperature that is increased by equal to or greater than about 10 C when compared to a thermal decomposition temperature of the same PP used for coating the f-MWNT comprising carboxylic acid groups but in the absence of the f-MWNT comprising carboxylic acid groups, as determined by thermogravimetric analysis (TGA) under a nitrogen atmosphere;
    a crystallization temperature that is increased by equal to or greater than about 2° C. when compared to a crystallization temperature of the same PP used for coating the f-MWNT comprising carboxylic acid groups but in the absence of the f-MWNT comprising carboxylic acid groups, as determined by differential scanning calorimetry (DSC) thermal analysis in accordance with ASTM E794-06; and
    a melting temperature that is increased by equal to or greater than about 1° C. when compared to a melting temperature of the same PP used for coating the f-MWNT comprising carboxylic acid groups but in the absence of the f-MWNT comprising carboxylic acid groups, as determined by differential scanning calorimetry (DSC) thermal analysis in accordance with ASTM E794-06.

20. The PP/f-MWNT comprising carboxylic acid groups of claim 11, wherein the PP/f-MWNT comprising carboxylic acid groups comprise equal to or greater than about 50 wt. % discrete f-MWNT comprising carboxylic acid groups coated with PP (discrete PP/f-MWNT comprising carboxylic acid groups), based on the total weight of the f-MWNT comprising carboxylic acid groups; and wherein the discrete PP/f-MWNT comprising carboxylic acid groups have a diameter of from about 6 nm to about 210 nm.

* * * * *